US010954331B2

(12) United States Patent
Eisenbarth et al.

(10) Patent No.: US 10,954,331 B2
(45) Date of Patent: Mar. 23, 2021

(54) METHOD OF PREPARING A POLYROTAXANE AND POLYROTAXANE

(71) Applicant: UNIVERSITAET DES SAARLANDES, Saarbruecken (DE)

(72) Inventors: Harley Eisenbarth, Saarbruecken-Dudweiler (DE); Daniel Fernschild, Ottweiler (DE); Jessica Hilschmann, Saarbruecken (DE); Gergely Kali, Saarbruecken (DE); Gerhard Wenz, St. Ingbert (DE)

(73) Assignee: UNIVERSITAET DES SAARLANDES, Saarbruecken (DE)

( * ) Notice: Subject to any disclaimer, the term of this patent is extended or adjusted under 35 U.S.C. 154(b) by 14 days.

(21) Appl. No.: 15/736,863

(22) PCT Filed: Jun. 16, 2016

(86) PCT No.: PCT/EP2016/063838
§ 371 (c)(1),
(2) Date: Dec. 15, 2017

(87) PCT Pub. No.: WO2016/202906
PCT Pub. Date: Dec. 22, 2016

(65) Prior Publication Data
US 2018/0362691 A1 Dec. 20, 2018

(30) Foreign Application Priority Data

Jun. 17, 2015 (LU) .......................................... 92744

(51) Int. Cl.
*C08F 236/08* (2006.01)
*C08J 3/24* (2006.01)
(Continued)

(52) U.S. Cl.
CPC ........ *C08F 236/08* (2013.01); *C08F 293/005* (2013.01); *C08G 83/007* (2013.01);
(Continued)

(58) Field of Classification Search
CPC .. C08G 83/007; C08F 293/005; C08F 236/08; C08J 2300/21; C08J 3/24; C08J 3/246
See application file for complete search history.

(56) References Cited

U.S. PATENT DOCUMENTS 4,265,964 A * 5/1981 Burkhart ................. C04B 28/14
423/171
7,943,718 B2    5/2011 Ito et al.
(Continued)

FOREIGN PATENT DOCUMENTS

EP    0710675 A2    5/1996
EP    1921102 A1    5/2008
(Continued)

OTHER PUBLICATIONS

Yu et al., "Novel triblock copolymer synthesized via radical telomerization of N-isopropylacrylamide in the presence of polypseudorotaxanes made from thiolated PEG and α-CDs," Polymer 47, 6066-6071 (Year: 2006).*
(Continued)

*Primary Examiner* — Kregg T Brooks
(74) *Attorney, Agent, or Firm* — Dilworth IP, LLC

(57) ABSTRACT

The present invention relates to a method of preparing a polyrotaxane, said method comprising:
performing a radical copolymerization of at least (a) a first polymerizable monomer having a stopper group, and of at least (b) a second polymerizable monomer, wherein said second monomer is complexed by a ring-shaped molecule;
wherein during said copolymerization a copolymer threading said ring-shaped molecule is formed,
(Continued)

General structures of the claimed polyrotaxanes having random copolymeric (a) and block copolymeric (b) structures.

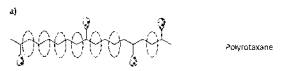

Polyrotaxane

With:

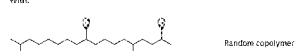

Random copolymer

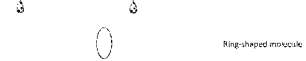

Ring-shaped molecule

Stopper group b)

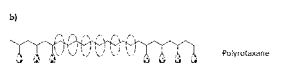

Polyrotaxane

With:

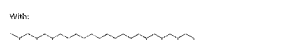

Block copolymer

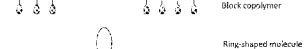

Ring-shaped molecule

Stopper group wherein during said copolymerization said first monomer having a stopper group is incorporated into the chain of said copolymer at least partially between the ends thereof, and wherein said stopper groups prevent said ring-shaped molecule from disassembling from the copolymer; and wherein the amount of said first monomer having a stopper group is of from 0.1 mol % to 20 mol % based on 100 mol % of the total amount of polymerizable monomers.

The present invention also relates to polyrotaxanes which can be prepared by using such a method.

The present invention further relates to cross-linked polyrotaxanes, products which contain polyrotaxanes or cross-linked polyrotaxanes or which can be prepared from polyrotaxanes or cross-linked polyrotaxanes, and the use of polyrotaxanes or cross-linked polyrotaxanes.

20 Claims, 13 Drawing Sheets

(51) Int. Cl.
  *C08G 83/00* (2006.01)
  *C08J 3/075* (2006.01)
  *C08F 293/00* (2006.01)

(52) U.S. Cl.
  CPC ............... *C08J 3/075* (2013.01); *C08J 3/24* (2013.01); *C08J 3/246* (2013.01); *C08F 2438/01* (2013.01); *C08F 2438/03* (2013.01); *C08J 2300/21* (2013.01); *C08J 2347/00* (2013.01); *C08J 2353/02* (2013.01)

(56) References Cited

U.S. PATENT DOCUMENTS 8,497,320 B2 * 7/2013 Ruslim ............... C08B 37/0015
                                                          525/54.26
2016/0122605 A1 * 5/2016 Hayashi ............... C09D 167/04
                                                           525/54.3

FOREIGN PATENT DOCUMENTS

| EP | 2397527 A1 | 12/2011 |
| JP | H08208727 A | 8/1996 |
| JP | 2007063398 A | 3/2007 |
| JP | WO2006090819 A1 | 7/2008 |
| JP | 2015045028 A | 3/2015 |
| KR | 20050120027 A * | 12/2005 |
| WO | 97/09354 A1 | 3/1997 |
| WO | 01/38408 A2 | 5/2001 |

OTHER PUBLICATIONS

Partial machine translation of WO 01/38408 (2019).*
Machine translation of KR-20050120027-A.*
Zhou et al., Reactive & Functional Polymers, Elsevier Science Publishers BV, NL, vol. 73, No. 3, Dec. 8, 2012, pp. 508-517.
Ni et al., Polymer Bulletin, Springer Berlin DE, vol. 61, No. 1, Apr. 2, 2008, pp. 53-62.
Ogawa et al., Polymer Journal, vol. 43, No. 11, Sep. 14, 2011, pp. 909-915.
PCT International Search Report and Written Opinion dated Aug. 5, 2016 from corresponding Application No. PCT/EP2016/063838, 18 pages.
Harada et al., J. Am. Chem. Soc. 1994, 116, 3192-3196.
Zhao et al., Macromolecules 2003, 36, 9859-9865.
Teuchert et al., Macromolecules 2013, 46, 2-7.
Harada et al., Carbohydr. Res. 1998, 305, 127-129.
Barndrup et al., Polymer Handbook, 4th edition, John Wiley and Sons, Inc., 1999, pp. II/2-II/69.
Sarac, Prog. Polym. Sci. 1999, 24, 1149-1204.
Barner-Kowollik, Handbook of RAFT Polymerization, Wiley-VCH, 2008, pp. 1-543.
Matyjaszewski et al., Chem. Rev. 2001, 101, 2921-2990.
Silva et al., Biomacromolecules 2013, 14, 2703-2712.
Wicks et al., Prog. Org. Coatings 1999, 36, 148-172.
Ito, Polym. J. (Tokyo, Jpn.) 2007, 39, 489-499.
Notification of Reasons for Rejection Issued in Japanese Patent Application No. 2017-565197, dated Aug. 25, 2020, 7 pages.

* cited by examiner

Fig. 1 General structures of the claimed polyrotaxanes having random copolymeric (a) and block copolymeric (b) structures.
a)
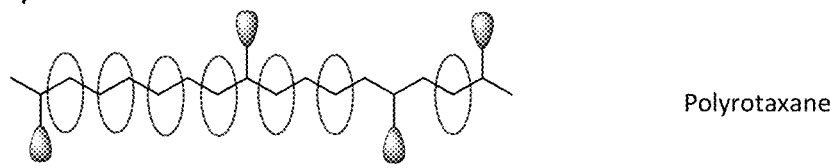
Polyrotaxane
With:
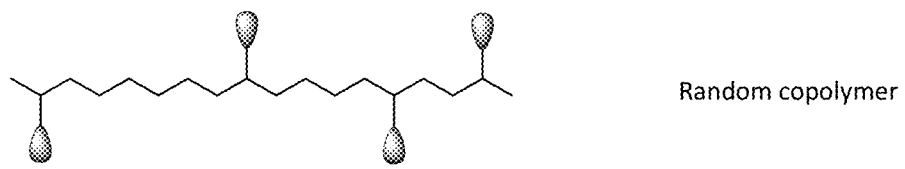
Random copolymer
Ring-shaped molecule
Stopper group
b)
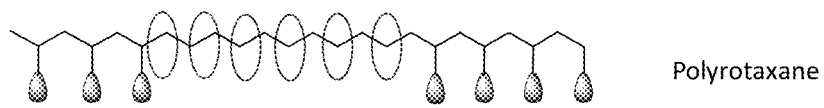
Polyrotaxane
With:
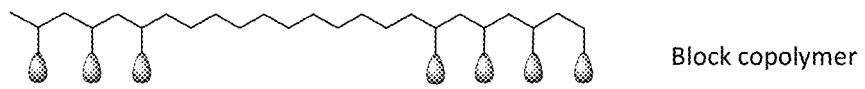
Block copolymer
Ring-shaped molecule
Stopper group Fig. 2 Slide ring gel formation from polyrotaxane by cross-linking trough the ring shaped molecules.
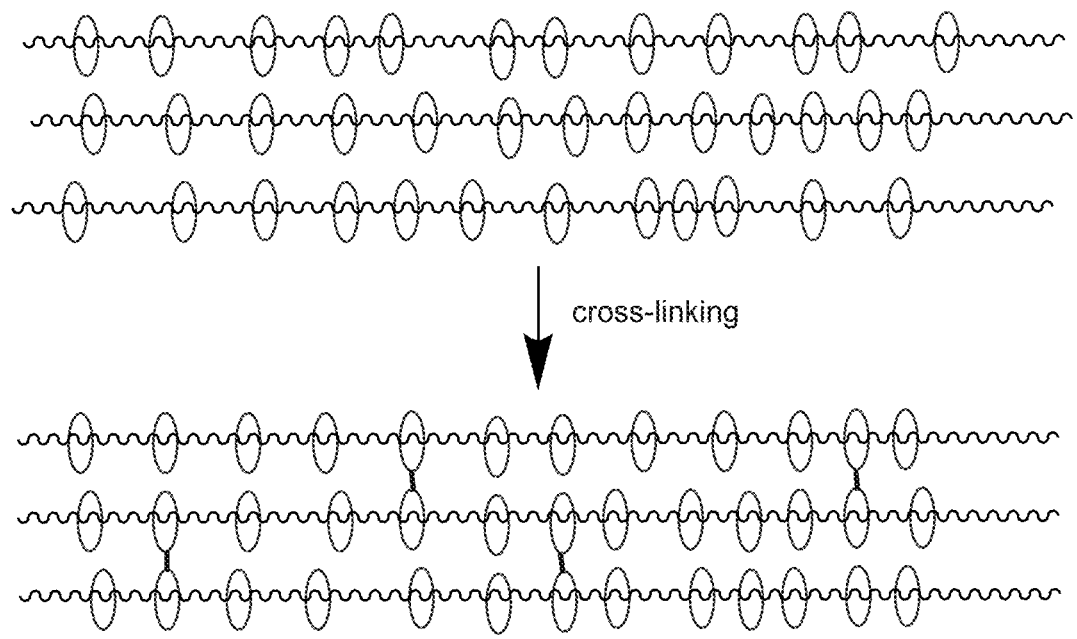

Fig. 3 $^1$H NMR spectra of cyclodextrin based polyisoprene-polystyrol random copolymeric polyrotaxane from Example 2 before (a) and after (b) the hydrolysis of the threaded cyclodextrin in CDCl$_3$.
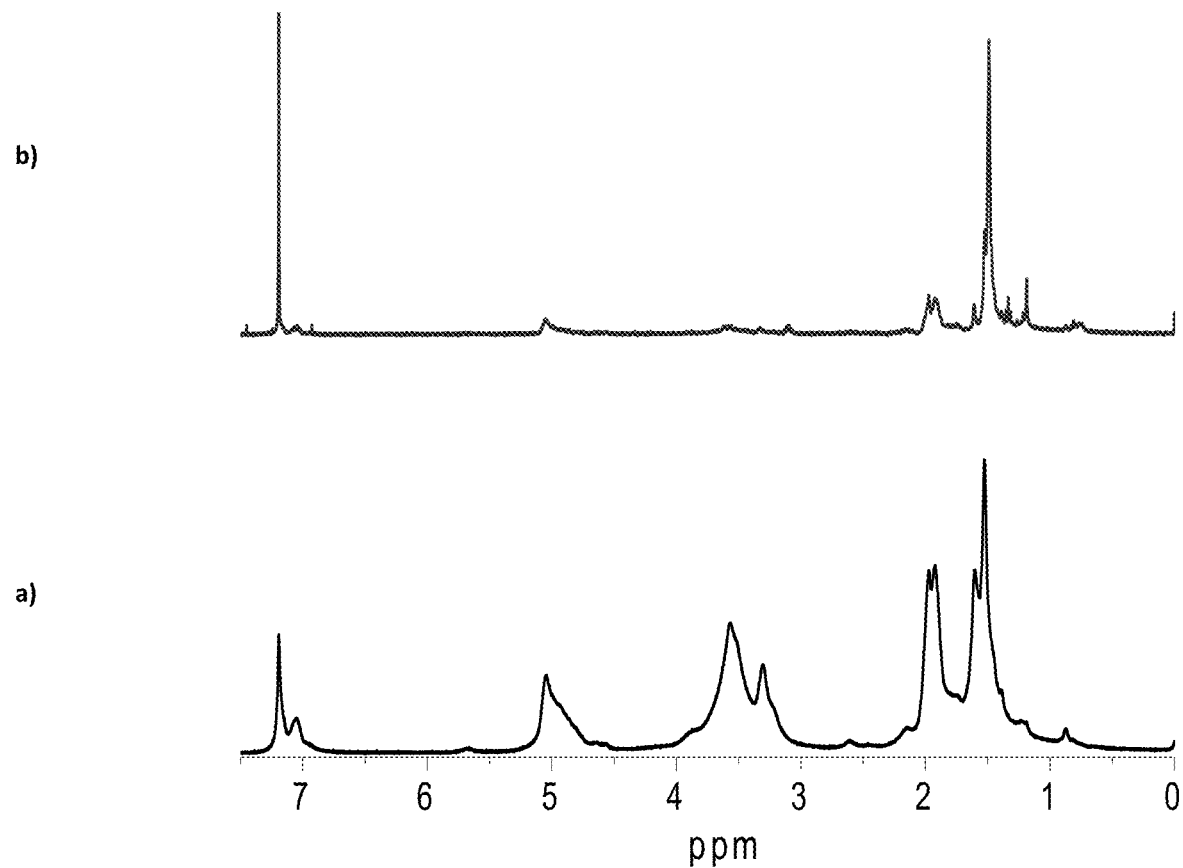

Fig. 4 ROESY NMR spectrum of cyclodextrin based polyisioprene-polystyrol random copolymeric polyrotaxane from Example 2 in CDCl$_3$.
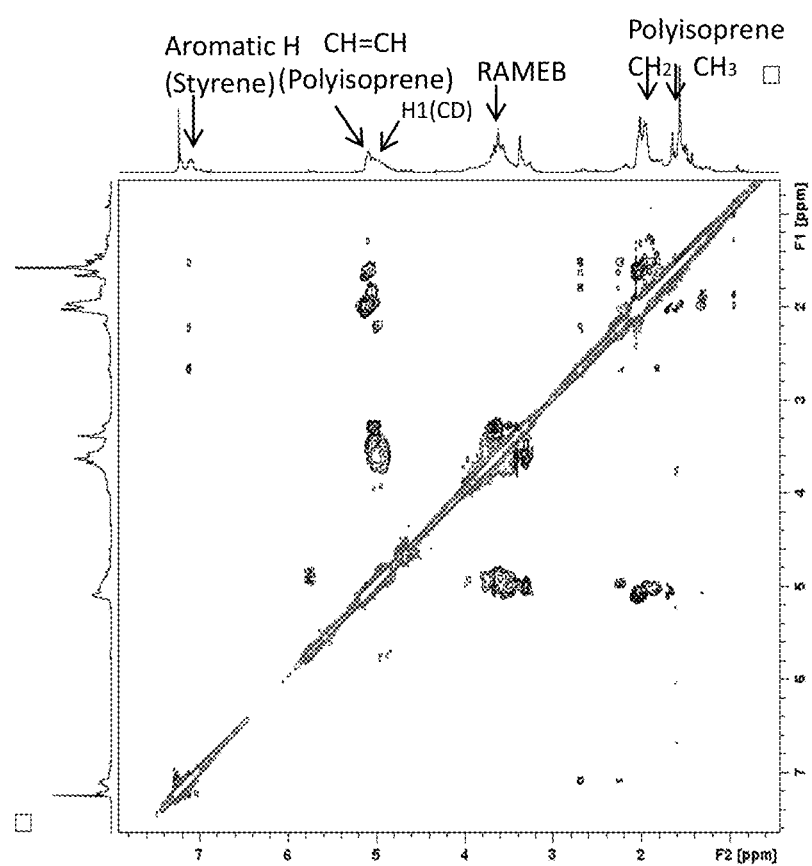

Fig. 5 DOSY NMR spectrum of cyclodextrin based polyisioprene-poly(polyethylene glycol) random copolymeric polyrotaxane from Example 5 in CDCl$_3$
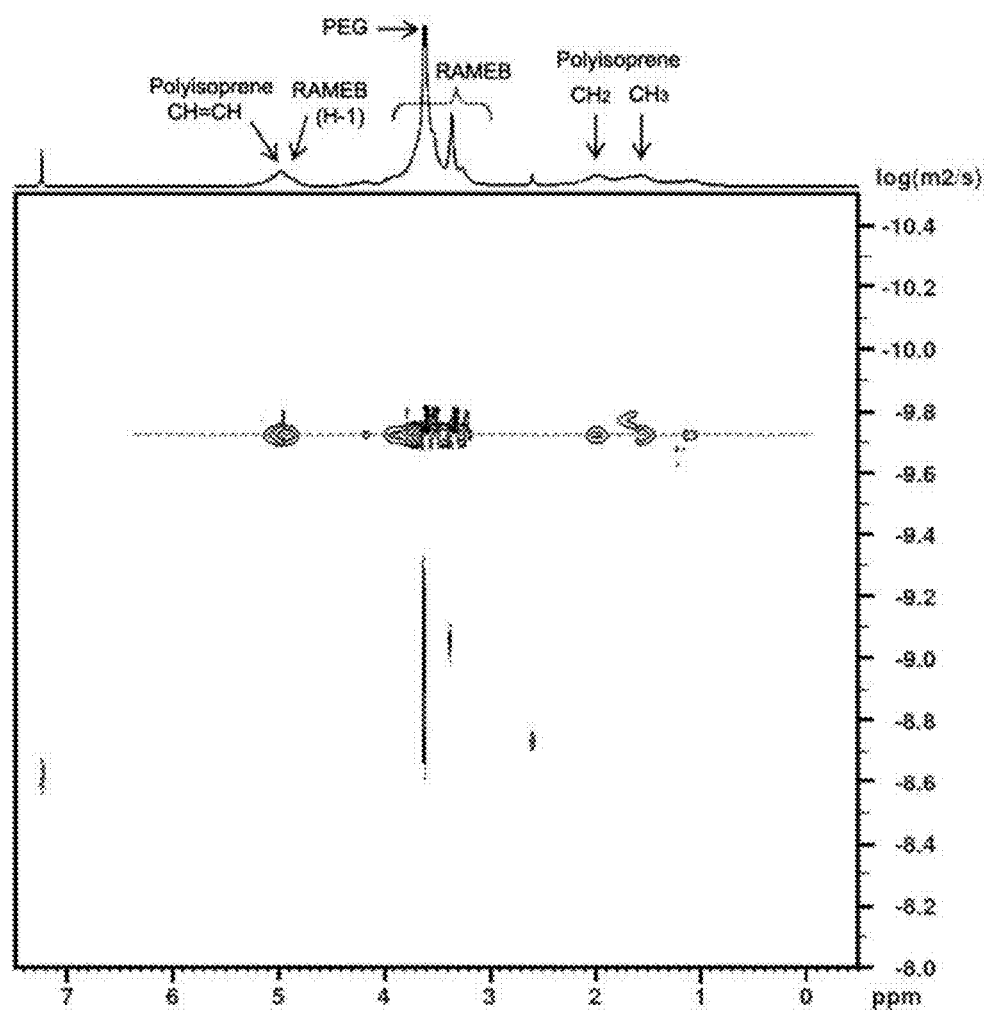

Fig. 6 Isothermal calorimetric titration curve of cyclodextrin based polyisoprene-poly(polyethylene glycol) random copolymeric polyrotaxane from Example 5 at 25°C, in pH=7 aq. phosphate buffer.
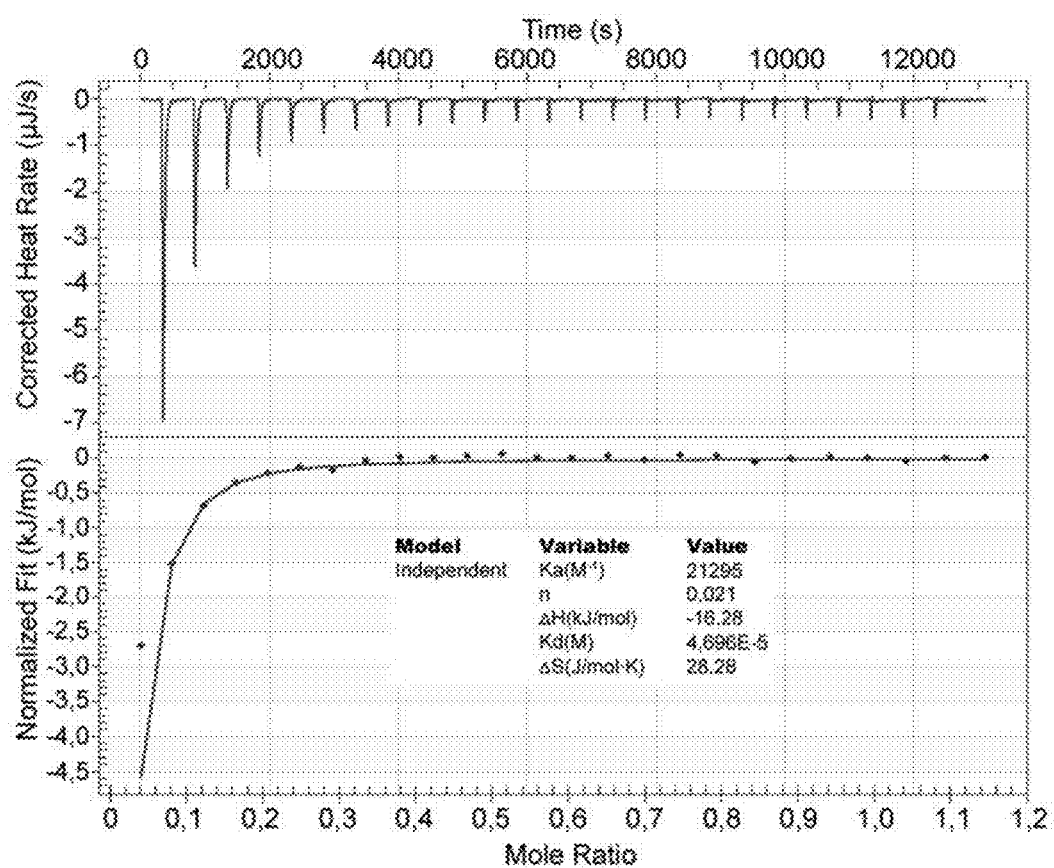

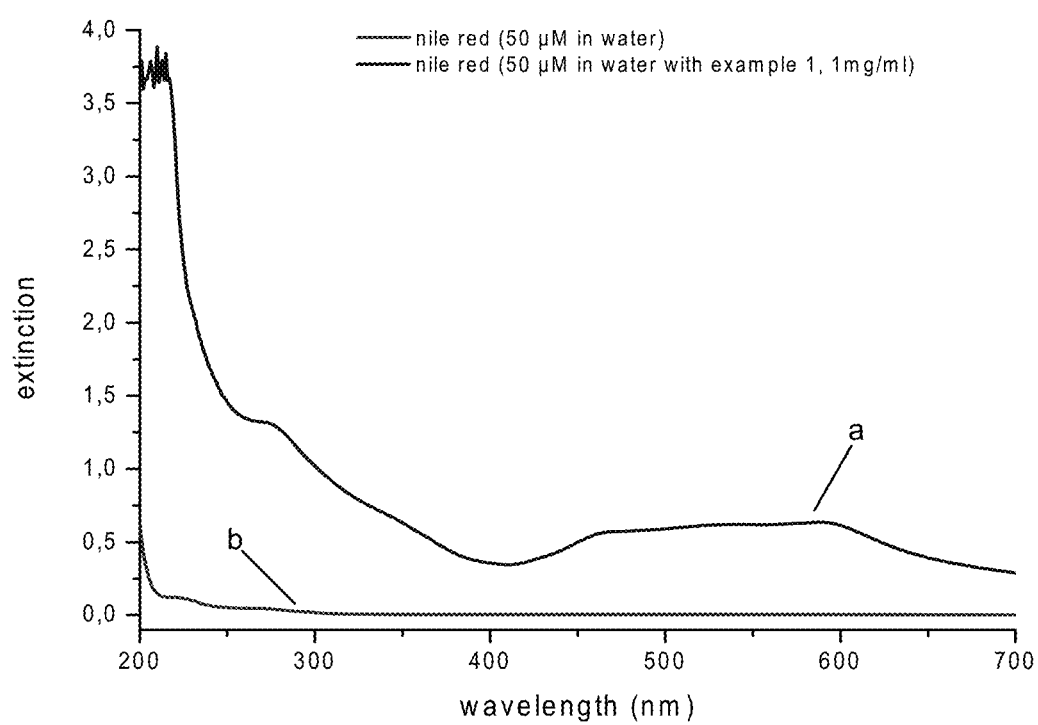
Fig. 7 UV-Vis spectra of nile red, as a model hydrophobic drug (a) with and (b) without the addition of cyclodextrin based polyisioprene-poly(polyethylene glycol) random copolymeric polyrotaxane from Example 1, in water.

Fig. 8 SEM images of cyclodextrin based polyisoprene-poly(polyethylene glycol) random copolymeric polyrotaxane from Example 1 with scale bars 10 μm (left) and 1 μm (right).
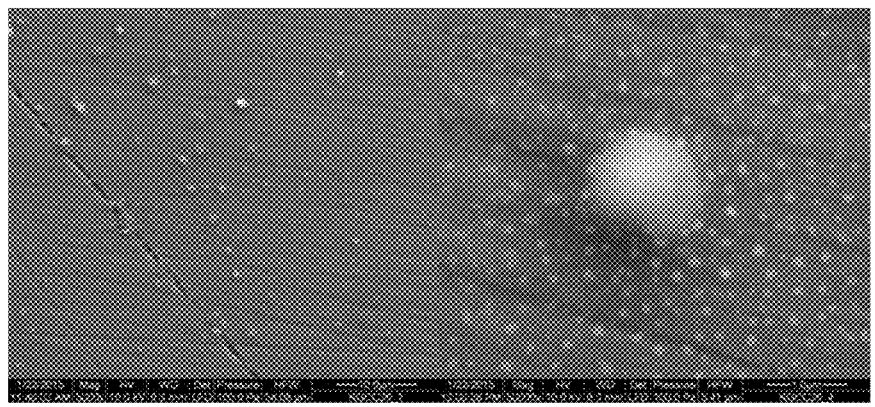

Fig. 9 Uptake of docetaxel by a 0.1 wt.% solution of polyrotaxane from Example 9 as a function of the amount of added drug.
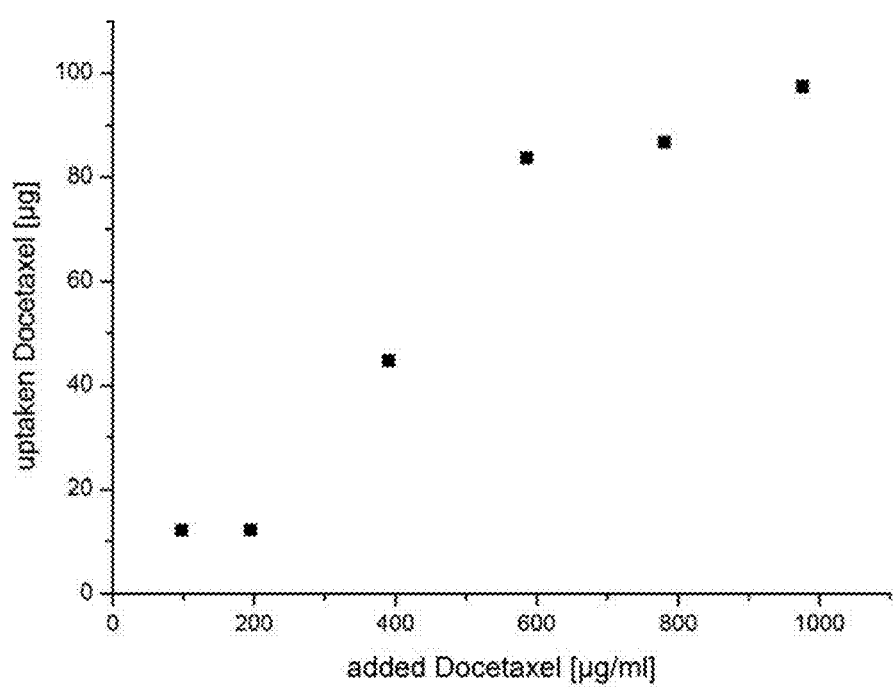

Fig. 10 $^1$H NMR (400 MHz, d$_6$-DMSO) of polyrotaxane from Example 11
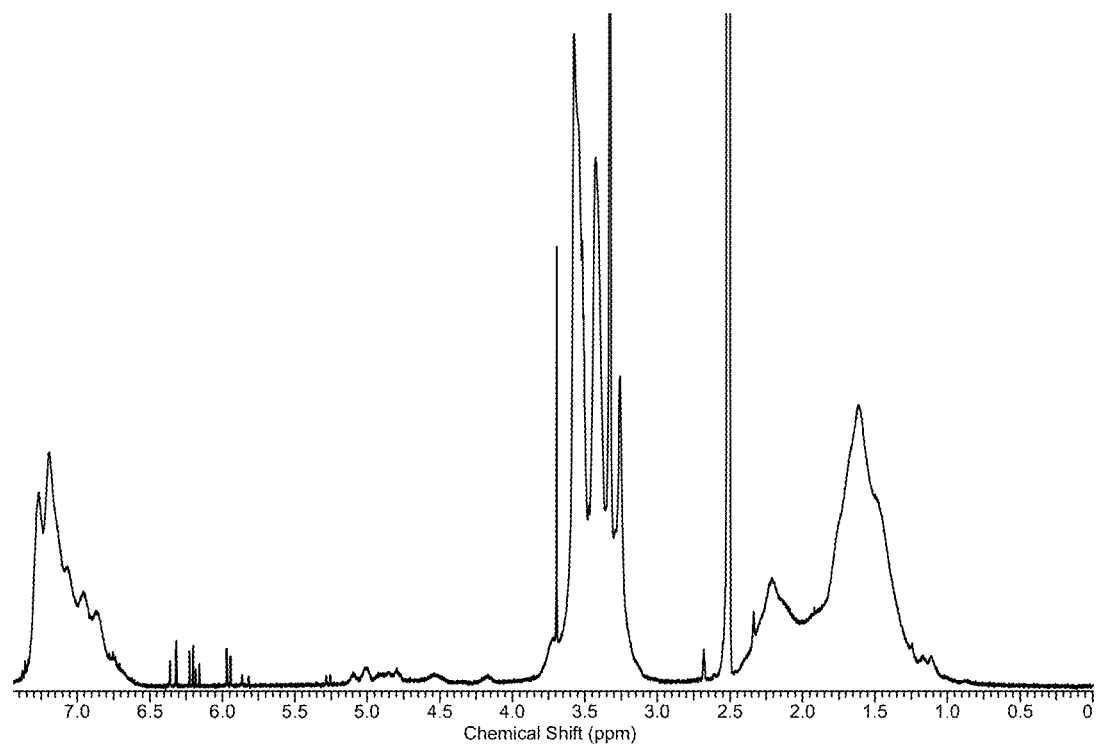

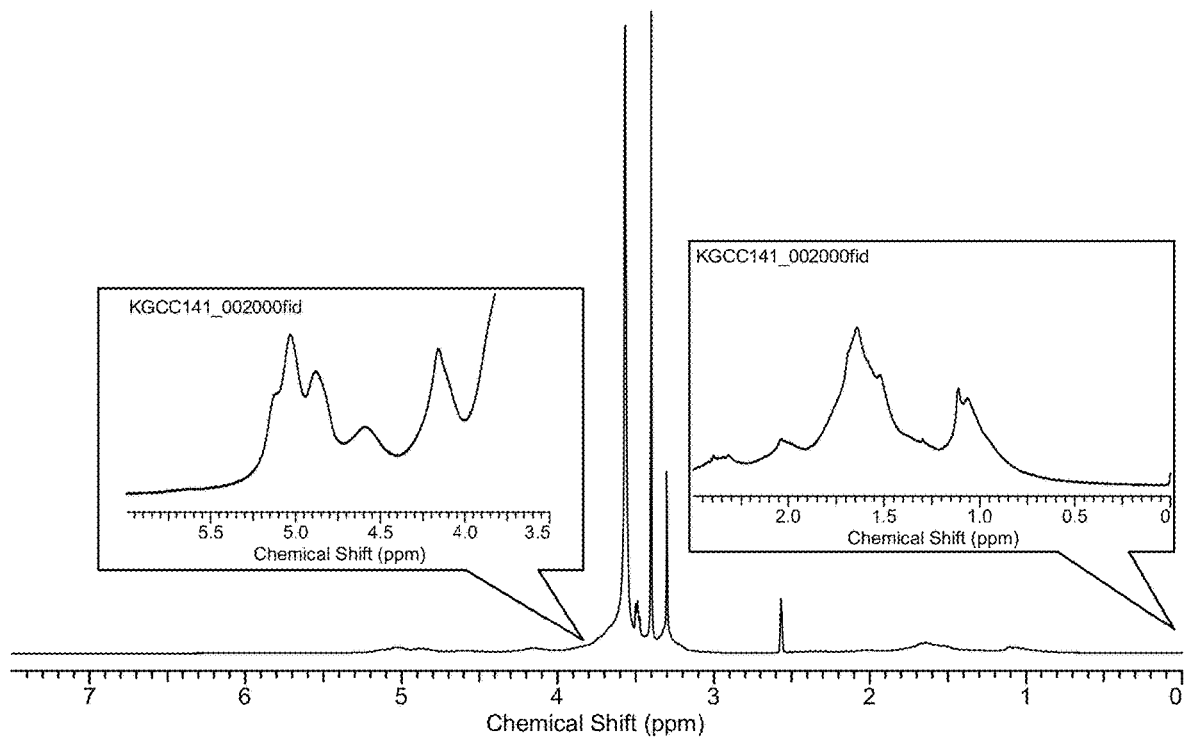
Fig. 11 ¹H NMR (400 MHz, d6-DMSO) of polyrotaxane from Example 12

Fig. 12 $^1$H NMR (400 MHz, d$_6$-DMSO) of polyrotaxane from Example 13
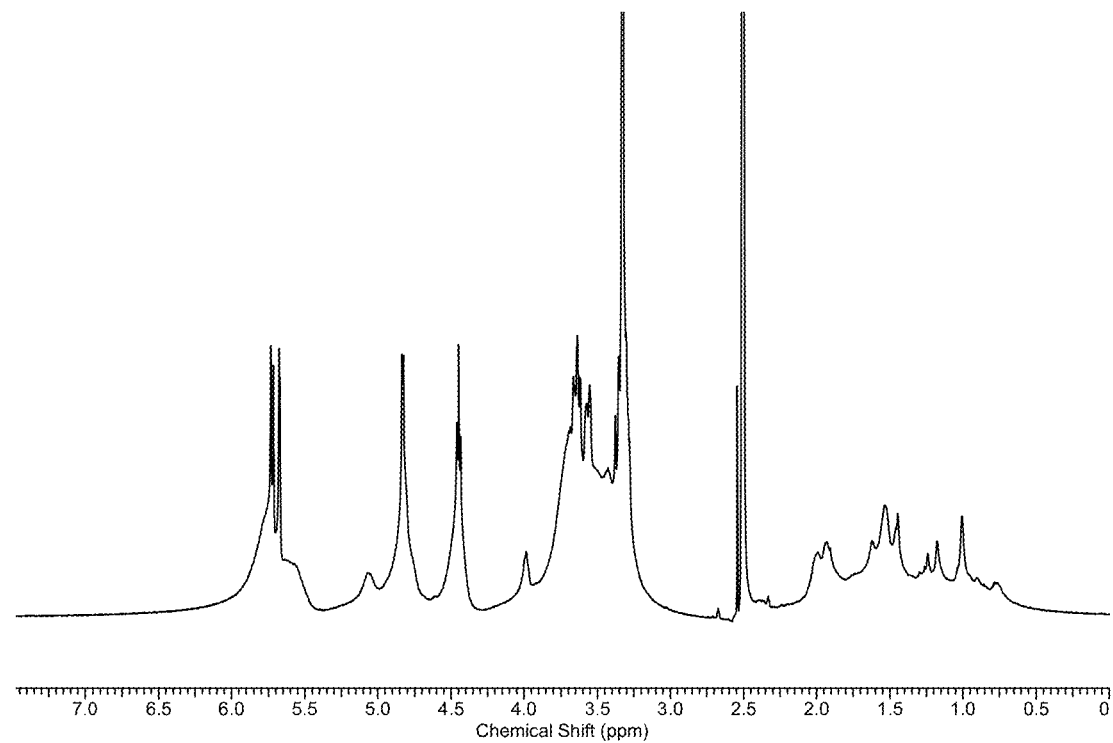

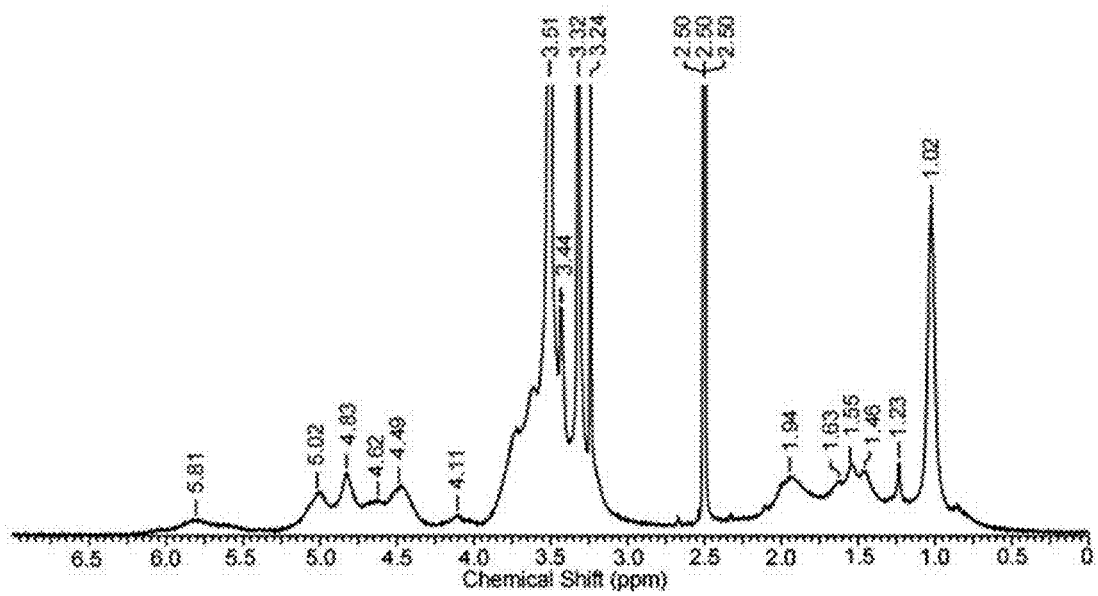
Fig. 13 $^1$H NMR (400 MHz, d$_6$-DMSO) of polyrotaxane from Example 14

METHOD OF PREPARING A POLYROTAXANE AND POLYROTAXANE

FIELD OF THE INVENTION

The present invention relates to methods of preparing polyrotaxanes and polyrotaxanes which can be prepared by using such methods. Furthermore, the invention relates to methods of preparing cross-linked polyrotaxanes and cross-linked polyrotaxanes which can be prepared using such methods. The invention also relates to products which contain the polyrotaxanes or cross-linked polyrotaxanes or which can be prepared from the polyrotaxanes or the cross-linked polyrotaxanes. The present invention further relates to the use of polyrotaxanes or cross-linked polyrotaxanes in various applications.

BACKGROUND OF THE INVENTION

Polyrotaxanes have become interesting materials for industrial applications, such as, for example, as materials for paints and adhesives.

Polyrotaxanes are supramolecular assemblies which comprise a ring-shaped molecule and a polymer. In a polyrotaxane the ring-shaped molecule is threaded by the polymer, wherein the polymer pierces through the opening of the ring-shaped molecule.

A known synthetic approach for obtaining a polyrotaxane comprises at first providing a polymer which has been synthesized before the polyrotaxane is formed. Then the polymer is mixed with the ring-shaped molecule, and the ring-shaped molecule is threaded by the polymer chain. In order to prevent the threaded ring-shaped molecule from leaving the polymer chain, blocking groups need to be placed at the ends of the polymer chain which prevent the ring-shaped molecule from leaving the polymer chain and thus disassembling of the polyrotaxane.

U.S. Pat. No. 7,943,718 B2 discloses a method of forming a polyrotaxane wherein a poly(ethylene glycol) is mixed with a cyclodextrin. The cyclodextrin is then threaded by the poly(ethylene glycol) chain to form an inclusion complex which is recovered from the reaction mixture. In the next step the inclusion complex is dispersed in a reaction medium, and adamantyl groups are attached to both ends of the poly(ethylene glycol) chain. Since the adamantyl group is a sterically highly encumbering group, these groups prevent the cyclodextrin from leaving the poly(ethylene glycol) chain.

While poly(ethylene glycol) is a hydrophilic polymer, it has been turned out difficult to thread cyclodextrins on hydrophobic polymer chains, such as, for example, polyisoprene or polybutadiene. In addition, the synthesis disclosed in U.S. Pat. No. 7,943,718 B2 requires that the attachment of sterically encumbering groups which prevent the ring-shaped molecule from leaving the polymer chain is performed in a separate step. This makes the synthetic protocol more complex.

There is hence a need for providing further methods of preparing a polyrotaxane which can be performed easily and which are broadly applicable, and for providing further polyrotaxanes.

SUMMARY OF THE INVENTION

This need is addressed by the present invention as defined in the claims, described in the description, and illustrated in the Examples and Figures.

The present invention relates to a method of preparing a polyrotaxane, said method comprising:
performing a radical copolymerization of at least (a) a first polymerizable monomer having a stopper group, and of at least (b) a second polymerizable monomer, wherein said second monomer is complexed by a ring-shaped molecule;
wherein during said copolymerization a copolymer threading said ring-shaped molecule is formed, wherein during said copolymerization said first monomer having a stopper group is incorporated into the chain of said copolymer at least partially between the ends thereof, and wherein said stopper groups prevent said ring-shaped molecule from disassembling from the copolymer; and
wherein the amount of said first monomer having a stopper group is of from 0.1 mol % to 20 mol % based on 100 mol % of the total amount of polymerizable monomers.

In an embodiment of the method of preparing a polyrotaxane of the present invention, the method comprises the steps of:
(a) providing a composition comprising a ring-shaped molecule and the first polymerizable monomer having a stopper group;
(b) combining the second polymerizable monomer with the composition of step (a) and forming a complex of said ring-shaped molecule with said second monomer; and
(c) performing a radical copolymerization on the composition of step (b) to form a polyrotaxane;
wherein during said copolymerization a random copolymer threading said ring-shaped molecule is formed, wherein during said copolymerization said first monomer having a stopper group is incorporated randomly along the chain of said copolymer.

In another embodiment of the method of preparing a polyrotaxane of the present invention, the method comprises the steps of:
(a) providing a composition comprising a ring-shaped molecule and the second polymerizable monomer;
(b) performing a radical polymerization on the composition of step (a) using a bifunctional radical initiator to form a block B comprising repeating units derived from said second monomer, wherein said second monomer is complexed with the ring-shaped molecule;
(c) combining the first polymerizable monomer having a stopper group with the block B; and
(d) radically copolymerizing the first polymerizable monomer to both ends of the block B to form blocks A at both ends of block B comprising repeating units derived from said first monomer,
wherein during said copolymerization an ABA block copolymer is formed, wherein said ring-shaped molecule is threaded on block B, and wherein the block B is arranged between said blocks A.

In another embodiment of the method of preparing a polyrotaxane of the present invention, the method comprises the steps of:
(a) providing a composition comprising the first polymerizable monomer having a stopper group;
(b) performing a radical polymerization on the composition of step (a) in the presence of a bifunctional chain transfer agent to form a block A comprising repeating units derived from said first monomer;
(c) combining the second polymerizable monomer with block A; and
(d) radically copolymerizing the second polymerizable monomer with block A to form a block B which is inserted into block A and comprises repeating units derived from said second monomer, wherein said second monomer is complexed by a ring-shaped molecule;

wherein during said copolymerization an ABA block copolymer is formed, wherein said ring-shaped molecule is threaded on block B, and wherein the block B is arranged between blocks A.

In still another embodiment of the method of preparing a polyrotaxane of the present invention, the method comprises the steps of:

(a) providing a composition comprising the first polymerizable monomer having a stopper group;

(b) performing a radical polymerization on the composition of step (a) to form a block A comprising repeating units derived from said first monomer having a stopper group;

(c) radically copolymerizing the second polymerizable monomer to said block A to form a block B comprising repeating units derived from said second polymerizable monomer attached to said block A, wherein said second monomer is complexed by a ring-shaped molecule; and (d) radically copolymerizing a third polymerizable monomer having a stopper group to said block B to form a block C, wherein said third monomer is same or different from said first monomer;

wherein during said copolymerization an ABC block copolymer is formed, wherein said ring-shaped molecule is threaded on block B, and wherein the block B is arranged between said block A and said block C; and wherein the combined amount of said first monomer and said third monomer having a stopper group is of from 0.1 mol % to 20 mol % based on 100 mol % of the total amount of polymerizable monomers.

The present invention also relates to a polyrotaxane comprising a ring-shaped molecule and a copolymer threading said ring-shaped molecule, wherein said copolymer is a non-ionic copolymer comprising at least (a) structural units derived from a first polymerizable monomer having a stopper group and at least (b) structural units derived from a second polymerizable monomer, wherein said structural units derived from the first monomer having a stopper group are incorporated into the chain of said copolymer at least partially between the ends thereof, wherein said stopper groups prevent the ring-shaped compound from disassembling from the copolymer, and wherein the amount of said structural units derived from a first monomer having a stopper group is 0.1 mol % to 20 mol % based on 100 mol % of the total amount of structural units of the copolymer.

In one embodiment of the polyrotaxane of the present invention, the polyrotaxane is obtainable or is obtained by any one of the methods of the present invention described herein.

In one embodiment of the polyrotaxane of the present invention, said copolymer is a random copolymer, wherein said structural units derived from said first polymerizable monomer having a stopper group are incorporated randomly along the chain of said copolymer at least partially between the ends thereof.

In another embodiment of the polyrotaxane of the present invention said copolymer is a block copolymer comprising a block A comprising repeating units derived from said first polymerizable monomer having a stopper group, a block B comprising repeating units derived from said second polymerizable monomer, and a block C comprising repeating units derived from a third polymerizable monomer, wherein said repeating units derived from said third monomer are same or different from said repeating units derived from said first monomer, wherein in said block copolymer said block B is arranged between said block A and said block C, wherein said ring-shaped molecule is threaded on block B, and wherein the combined amount of said structural units derived from said first monomer and said structural units derived from said third monomer is of from 0.1 mol % to 20 mol % based on 100 mol % of the total amount of structural units of the copolymer.

The present invention further relates to a method of preparing a cross-linked polyrotaxane, said method comprising the steps of (a) providing a polyrotaxane as described herein and of (b) chemically or physically cross-linking said polyrotaxane.

Accordingly, the present invention also relates to a cross-linked polyrotaxane, wherein any polyrotaxane described herein is chemically or physically cross-linked.

The present invention also relates to the use of a polyrotaxane or a cross-linked polyrotaxane described herein as a self-healing material.

The present invention further relates to the use of a polyrotaxane or a cross-linked polyrotaxane described herein for encapsulation of, for example, a pharmaceutically active agent.

Also, the present invention relates to the use of a polyrotaxane or a cross-linked polyrotaxane described herein as a carrier for a pharmaceutically active agent.

The present invention further relates to a method of coating of a surface with a polyrotaxane, the method comprising coating a solution or a dispersion containing a polyrotaxane described herein onto the surface.

Also, the present invention relates to the use of a cross-linked polyrotaxane described herein as an adhesive.

The present invention further relates to a dispersion composed of metal and/or metal oxide particles and a polyrotaxane described herein.

The present invention also relates to a composite composed of metal and/or metal oxide particles and a polyrotaxane described herein.

BRIEF DESCRIPTION OF THE DRAWINGS

FIG. 1 shows schematic representations of polyrotaxanes in accordance with embodiments of the present invention.

FIG. 2 shows a schematic representation of the formation of a slide-ring gel and a slide-ring gel in accordance with embodiments of the present invention.

FIG. 3 shows $^1$H NMR spectra of a) a polyrotaxane in accordance with an Example 2 of the present invention and b) of a free copolymer obtained by hydrolysis of the polyrotaxane prepared as described in Example 2.

FIG. 4 shows a ROESY NMR spectrum of a polyrotaxane in accordance with an Example of the present invention showing that a cyclodextrin derivative is threaded on a copolymer.

FIG. 5 shows a DOSY NMR spectrum of a polyrotaxane in accordance with an Example of the present invention showing that a cyclodextrin is threaded on a copolymer.

FIG. 6 shows an isothermal titration calorimetry curve of a polyrotaxane in accordance with an Example of the present invention showing that nearly no free cyclodextrin is present in the sample.

FIG. 7 shows optical absorption spectra of the dye nile red a) in presence and b) in absence of a polyrotaxane in accordance with an Example of the present invention.

FIG. 8 shows an electron micrograph of spherical micellar aggregates formed in aqueous solution from a polyrotaxane in accordance with an Example of the present invention.

FIG. 9 shows a graphic representation of the uptake of a drug by a solution of a polyrotaxane in accordance with an Example of the present invention.

FIG. 10 shows a $^1$H NMR spectrum of a polyrotaxane in accordance with an Example of the present invention.

FIG. 11 shows a $^1$H NMR spectrum of a polyrotaxane in accordance with an Example of the present invention.

FIG. 12 shows a $^1$H NMR spectrum of a polyrotaxane in accordance with an Example of the present invention.

FIG. 13 shows a $^1$H NMR spectrum of a polyrotaxane in accordance with an Example of the present invention.

DETAILED DESCRIPTION OF THE INVENTION

It was an object of the present invention to provide further methods of preparing a polyrotaxane which can be performed easily and which are broadly applicable.

Thus, the present invention relates to a method of preparing a polyrotaxane, said method comprising:

performing a radical copolymerization of at least (a) a first polymerizable monomer having a stopper group, and of at least (b) a second polymerizable monomer, wherein said second monomer is complexed by a ring-shaped molecule;

wherein during said copolymerization a copolymer threading said ring-shaped molecule is formed, wherein during said copolymerization said first monomer having a stopper group is incorporated into the chain of said copolymer at least partially between the ends thereof, and wherein said stopper groups prevent said ring-shaped molecule from disassembling from the copolymer; and wherein the amount of said first monomer having a stopper group is of from 0.1 mol % to 20 mol % based on 100 mol % of the total amount of polymerizable monomers.

As used herein throughout the description, the term "polyrotaxane" relates to a supramolecular assembly which comprises a ring shaped molecule and a copolymer. FIG. 1 depicts schematic illustrations of polyrotaxanes in accordance with the present invention. As shown in FIG. 1 the ring-shaped molecule is threaded by the chain of the copolymer. With this regard, the term "ring-shaped molecule" refers to any cyclic molecule which has an inner opening, also denoted as cavity, wherein the opening is big enough for being pierced through by the copolymer. In other words, the copolymer threads the ring-shaped molecule by piercing through the opening thereof. However, the ring-shaped molecule is not covalently bonded to the copolymer so that the ring shaped molecule may rotate around the copolymer which forms an axis. In addition, in the polyrotaxane the ring-shaped molecule is movable along the copolymer. Such movability along the axis occurs within a section of the copolymer having a substantially linear structure, which section is in general formed from the second polymerizable monomer. With this regard, the term "substantially linear" does not exclude that such section is branched as far as the section having a substantially linear structure can thread the ring-shaped molecule in such a manner that the ring-shaped molecule is rotatable and exhibits movability along the section. In addition, a first polymerizable monomer having a stopper group is incorporated into the copolymer. Structural units of the copolymer derived from this first monomer having a stopper group prevent the ring-shaped molecule from leaving from the copolymer. In particular, the stopper groups block the movability of the ring-shaped molecule along the copolymer thereby preventing the ring-shaped molecule from disassembling from the copolymer. Hence, these stopper groups provide stability to the supramolecular structure of the polyrotaxane. With this regard, the term "stopper group" as used in the present disclosure in general refers to a part of the first monomer having steric bulk which is sufficient to block the movability of the ring-shaped molecule along the copolymer. For example, in order to block the movability of the ring-shaped molecule along the copolymer, the stopper group may be described as having a cross-section greater than the cross-section of the opening of the ring-shaped molecule. In the methods of preparing a polyrotaxane and the polyrotaxanes described herein the first monomer having a stopper group is incorporated at least partially between the ends of the copolymer. This means that the copolymer chain exhibits stopper groups at inner portions of the chain which are located between the chain ends. In the polyrotaxanes disclosed herein it is not even required that stopper groups are located at the ends of the copolymer. However, it is not excluded that in addition to stopper groups between the ends a stopper group is located at one or more ends of the copolymer. With this regard the term "end of the copolymer" or "end thereof" denotes a terminal position of the copolymer chain. By setting the upper limit of the first molecule having a stopper group to 20 mol % based on 100 mol % of the total amount of polymerizable monomers there are provided sections comprising structural units derived from the second monomer having sufficient length for allowing movability of the ring-shaped molecule along the copolymer.

The term "at least" as used in connection with the first monomer and the second monomer with regard to the methods of preparing a polyrotaxane and the polyrotaxanes described herein is to be understood that more than one first monomer having a stopper group and/or more than one second monomer can be employed. In other words, one, two, three or even more different first monomers having a stopper group may be used. Similarly, one, two, three or even more different second monomers may be employed. However, in some embodiments only one first and only one second monomer is used. In case that more than one first monomer is used, the upper limit of 20 mol % based on 100 mol % of the total amount of polymerizable monomers refers to the combined amounts of the first monomers.

The term "monomer" or "polymerizable monomer" as used herein throughout this description in general denotes a reactive molecule which can undergo polymerization thereby contributing many constitutional units, which are denoted as repeating units, to a polymer. Accordingly, the term "polymer" as used herein in general refers to a macromolecule which comprises many repeating subunits derived from one or more monomers. As purely illustrative examples, a monomer is a molecule having a carbon-carbon double bond or a molecule having at least two functional groups per molecule. In particular, a monomer may be a molecule having a low molecular weight.

Regarding the methods of preparing a polyrotaxane described herein, the second polymerizable monomer is complexed by the ring-shaped molecule. Such complexation is typically effected by inclusion of the second polymerizable monomer in the opening of the ring-shaped molecule. Then the second polymerizable monomer, which is complexed by the ring shaped molecule, is copolymerized with the first monomer. With this regard, complexation of the first monomer having a stopper group by a ring-shaped molecule is not necessary in the methods of the present invention. However, complexation of the first monomer is also not excluded. By the method of the present invention a polyrotaxane wherein the ring-shaped molecule is threaded by the copolymer is formed directly. This means that in contrast to methods of preparing a polyrotaxane known from the prior art, wherein the ring-shaped molecule is threaded on a polymer chain which has been prepared in advance, by performing the methods of the present disclosure no separate threading step is required since the formation of the copolymer and the polyrotaxane take place in one step.

Furthermore, methods of preparing a polyrotaxane known from the prior art such as U.S. Pat. No. 7,943,718 B2, wherein the ring-shaped molecule is threaded on a polymer chain which has been prepared in advance, require that after threading of the ring-shaped molecule the inclusion complex formed is isolated and that afterwards in a further step the ends of the polymer chain are capped with bulky blocking groups which prevent the ring-shaped molecule from leaving the polymer chain. On the other hand, by employing the methods of preparing a polyrotaxane described herein the first monomer having a stopper group which prevents the ring-shaped molecule from disassembling is incorporated into the copolymer during the copolymerization. Therefore, as an additional advantage a separate step of attaching groups to the polymer chain which prevent the ring-shape molecule from leaving the polymer after polymerization may be omitted when performing the methods of preparing a polyrotaxane as described herein. Consequently, the present methods can save additional steps.

Analytical methods for proving the existence of the polyrotaxane structure are known to the person skilled in the art. For example, the structure of soluble polyrotaxanes can be assessed using (a) Nuclear Overhauser NMR spectroscopy (NOESY) (see, for example, A. Harada, J. Li, M. J. Kamachi, J. Am. Chem. Soc. 1994, 116, 3192-3196), (b) diffusion ordered NMR spectroscopy (DOSY), (see, for example, T. J. Zhao, H. W. Beckham, Macromolecules 2003, 36, 9859-9865), and (c) $^1$H NMR spectroscopy, wherein a broadening of the signal of a ring-shaped molecule such as a cyclodextrin is indicative for the threaded state (see, for example, C. Teuchert, C. Michel, F. Hausen, D.-Y. Park, H. W. Beckham, G. Wenz, Macromolecules 2013, 46, 2-7, supporting information). From crystalline samples the polyrotaxane structure can be obtained using X-ray scattering (see, for example, A. Harada, J. Li, M. Kamachi, Y. Kitagawa, Y. Katsube, Carbohydr. Res. 1998, 305, 127-129).

It is noted that polymerization of monomers complexed with a cyclodextrin is disclosed in the prior art, see, for example WO 01/38408 A2 and WO 97/09354 A1. However, these documents describe recovering of the cyclodextrin after polymerization and do not make any reference to a polyrotaxane.

The copolymerization of the methods of preparing a polyrotaxane described herein can be performed as random copolymerization or block copolymerization.

Accordingly, in one embodiment of the method of preparing a polyrotaxane of the present invention, a random copolymer is formed (see, for example, the exemplary polyrotaxane shown in FIG. 1a). This method comprises the steps of:
(a) providing a composition comprising a ring-shaped molecule and the first polymerizable monomer having a stopper group;
(b) combining the second polymerizable monomer with the composition of step (a) and forming a complex of said ring-shaped molecule with said second monomer; and
(c) performing a radical copolymerization on the composition of step (b) to form a polyrotaxane;
wherein during said copolymerization a random copolymer threading said ring-shaped molecule is formed, wherein during said copolymerization said first monomer having a stopper group is incorporated randomly along the chain of said copolymer.

According to this method the first and the second monomer are combined in step (b). Therefore, the first and the second monomer are present in the reaction mixture during the copolymerization of step (c) at the same time. As a consequence, this method results in the formation of a random copolymer, wherein stopper groups are randomly distributed along the copolymer between the chain ends. The random copolymerization of this embodiment may be, as non-limiting examples, performed as free radical polymerization, as atom transfer radical polymerization (ATRP), or as reversible addition fragmentation chain transfer radical polymerization (RAFT polymerization).

In another embodiment of the method of preparing a polyrotaxane of the present invention a block copolymer is formed. For example, a method of preparing a polyrotaxane wherein a block copolymer (see, for example, the exemplary polyrotaxane shown in FIG. 1b) is formed, may comprise the steps of:
(a) providing a composition comprising a ring-shaped molecule and the said second polymerizable monomer;
(b) performing a radical polymerization on the composition of step (a) using a bifunctional radical initiator to form a block B comprising repeating units derived from said second monomer, wherein said second monomer is complexed with the ring-shaped molecule;
(c) combining the first polymerizable monomer having a stopper group with the block B; and
(d) radically copolymerizing the first polymerizable monomer to both ends of the block B to form blocks A at both ends of block B comprising repeating units derived from said first monomer,
wherein during said copolymerization an ABA block copolymer is formed, wherein said ring-shaped molecule is threaded on block B, and wherein the block B is arranged between said first block A and said blocks A.

In step (b) of the method described in the preceding paragraph a block is formed from the second monomer which for the purpose of the present disclosure is denoted as block B. Since in step (b) a bifunctional radical initiator is used, the block B exhibits radical moieties capable of further adding radically polymerizable monomers at both ends of the polymer chain. Therefore, in case that the first monomer having a stopper group is added to the block B, in step (d) the first monomer is added at both ends of the second block in case that a bifunctional radical initiator is used. Therefore, by polymerizing the first polymer to both ends of block B, blocks A are formed from the first monomer which leads to a block copolymer having the block sequence ABA, wherein the blocks A are formed from the first monomer having a stopper group, and wherein the block B is formed from the second monomer. Since the second monomer is complexed by the ring-shaped molecule, the ring-shaped molecule is threaded on the block B. Blocks A formed from the first monomer having a stopper group prevent the ring-shaped molecule from disassembling from the block B. Preferably, the polymerization steps (b), (c) and (d) are performed in a one-pot procedure. More preferably, the whole block copolymerization is performed as a one-pot procedure. This means that intermediate products are not isolated from the reaction mixture. Alternatively, polymerization steps may be performed in the reverse order. The bifunctional radical initiator used in this method is not particularly limited. Each initiator having two moieties capable of radical initiation may be used. For example, 2,5-dimethyl-2,5-bis(benzoyl peroxy)hexane; 2,5-dimethyl-2,5-bis (2-ethyl hexanoyl peroxy)hexane tert-butyl 7-methyl-7-(tert-butylazo)peroxyoctanoate, and dibromo toluene/CuBr/N,N,N',N'',N''-Pentamethyldiethylenetriamine (PMDETA) are suitable bifunctional radical initiators. The methods disclosed herein using a bifunctional radical initiator for block copolymerization may be, for example, performed as free radical polymerization or as controlled radical polymerization. For example, in case that a bifunctional radical initiator is used atom transfer radical polymerization (ATRP) or reversible addition fragmentation chain transfer radical polymerization (RAFT polymerization) may be employed as controlled radical polymerization techniques. Using a controlled radical polymerization, such as, for example, ATRP or RAFT, is particularly preferred with regard to the formation of the block copolymer.

In another embodiment of the method of preparing a polyrotaxane of the present invention (see, for example, the exemplary polyrotaxane shown in FIG. 1b), the method comprises the steps of:
(a) providing a composition comprising the first polymerizable monomer having a stopper group;
(b) performing a radical polymerization on the composition of step (a) in the presence of a bifunctional chain transfer agent to form a block A comprising repeating units derived from said first monomer;
(c) combining the second polymerizable monomer with block A; and
(d) radically copolymerizing the second polymerizable monomer with block A to form a block B which is inserted into block A and comprises repeating units derived from said second monomer, wherein said second monomer is complexed by a ring-shaped molecule;
wherein during said copolymerization an ABA block copolymer is formed, wherein said ring-shaped molecule is threaded on block B, and wherein the block B is arranged between blocks A.

In step (b) of the method described in the preceding paragraph a block is formed from the first monomer having a stopper group which for the purpose of the present disclosure is denoted as block A. Since a bifunctional chain transfer agent is used, in step (d) the second monomer is inserted into the block A. Finally, by repeated insertion of second monomers a block B is formed during step (d), which is inserted into block A and comprises repeating units derived from the second polymerizable monomer. Therefore, a block copolymer having the block sequence ABA is obtained, wherein the blocks A are formed from the first monomer having a stopper group, and wherein the block B is formed from the second monomer. Since the second monomer is complexed by the ring-shaped molecule, the ring-shaped molecule is threaded on the block B. Blocks A formed from the first monomer having a stopper group prevent the ring-shaped molecule from disassembling from the block B. Preferably, the polymerization steps (b), (c) and (d) are performed in a one-pot procedure. More preferably, the whole block copolymerization is performed as a one-pot procedure. This means that intermediate products are not isolated from the reaction mixture. Alternatively, polymerization steps may be performed in the reverse order. The bifunctional chain transfer agent used in this method is not particularly limited. Each chain transfer agent having two moieties capable of chain transfer may be used. For example, bis(2-propionic acid) trithioc rbonate, S,S'-bis(2-hydroxylethyl-2'-butyrate)trithiocarbonate or S,S'-bis($\alpha,\alpha'$-dimethyl-$\alpha,\alpha''$-acetic acid)-trithiocarbonate are suitable bifunctional chain transfer agents. The methods disclosed herein using a bifunctional chain transfer agent for block copolymerization may be, as a preferred example, performed as reversible addition fragmentation chain transfer radical polymerization (RAFT polymerization).

In the methods described herein in general the first monomer having a stopper group is used in an amount of from 0.1 mol % to 20 mol % based on 100 mol % of the total amount of polymerizable monomers. Accordingly, in the polyrotaxanes described herein comprising a ring-shaped molecule and a copolymer threading the ring-shaped molecule, in general the amount of structural units derived from the first monomer having a stopper group is of from 0.1 mol % to 20 mol % based on 100 mol % of the total amount of structural units of the copolymer. In case that the amount of the monomer having a stopper group which is incorporated into the copolymer threading the ring-shaped molecule is higher than 20 mol % based on 100 mol % of the total amount of the polymerizable monomers, the amount of bulky stopper groups incorporated into the copolymer further increases, while the amount of the second monomer incorporated into the copolymer decreases. The second monomer forms sections of the copolymer having a substantially linear structure. The ring-shaped molecules are threaded onto these substantially linear sections. These threaded ring-shaped molecules are rotatable as well as movable along such section having a substantially linear structure. In case that the amount of the first monomer having a stopper group exceeds 20 mol % based on 100 mol % of the total amount of the polymerizable monomer, the amount of the second monomer incorporated into the copolymer further decreases. Accordingly, the length of the sections of the copolymer having a substantially linear structure, which are formed by the second monomer, decreases. As a consequence, the free moving space of the ring-shaped molecules is reduced. Accordingly, the movability of the ring-shaped molecules along the copolymer chain is restricted. Such restriction of the movability of the ring shaped molecules along the copolymer chain reduces the ability of the polyrotaxane to form mobile gels and slide ring gels which are useful as self-healing materials, surface coatings, adhesives and paints as described herein. In contrast, polyrotaxanes which are able to form gels and slide ring gels useful as self-healing materials, surface coatings, adhesives and paints, which represent important uses of the polyrotaxanes described herein, are obtained in case that in the methods disclosed herein the amount of the first monomer having a stopper group does not exceed 20 mol % based on 100 mol % of the total amount of polymerizable monomers. Accordingly, it is preferred that in the polyrotaxanes described herein the amount of structural units derived from the first monomer having a stopper group does not exceed 20 mol % based on 100 mol % of the total amount of structural units of the copolymer. On the other hand, it is readily appreciated that a minimum amount of stopper groups in the copolymer is required in order to prevent the ring-shaped compounds from disassembling from the copolymer. Accordingly, in the methods described herein the amount of the monomer having a stopper group is in general at least 0.1 mol % based on 100 mol % of the total amount of the polymerizable monomer. Likewise, in the polyrotaxanes described herein the amount of the structural units derived from the monomer having a stopper group is in general at least 0.1 mol % based on 100 mol % of the total amount of structural units of the copolymer.

In some embodiments of the method of preparing a polyrotaxane of the present invention, in particular in context with the methods wherein a random copolymer or a block copolymer are formed, the amount of said first monomer having a stopper group is of from 0.5 mol % to 18 mol % based on 100 mol % of the total amount of polymerizable monomers. Preferably, the amount of said first monomer having a stopper group is of from 1 mol % to 16 mol % based on 100 mol % of the total amount of polymerizable monomers. More preferably, the amount of said first monomer having a stopper group is of from 2 mol % to 15 mol % based on 100 mol % of the total amount of polymerizable monomers. Even more preferably, the amount of said first monomer having a stopper group is of from 3 mol % to 12 mol % based on 100 mol % of the total amount of polymerizable monomers. Most preferably, the amount of said first monomer is of from 5 mol % to 11 mol % based on 100 mol % of the total amount of polymerizable monomers.

Also described herein is another embodiment of the method of preparing a polyrotaxane wherein a block copolymer is formed. This method comprises the steps of:
(a) providing a composition comprising the first polymerizable monomer having a stopper group;
(b) performing a radical polymerization on the composition of step (a) to form a block A comprising repeating units derived from said first monomer having a stopper group;
(c) radically copolymerizing the second polymerizable monomer to said block A to form a block B comprising repeating units derived from said second polymerizable monomer attached to said block A, wherein said second monomer is complexed by a ring-shaped molecule; and
(d) radically copolymerizing a third polymerizable monomer having a stopper group to said block B to form a block C, wherein said third monomer is same or different from said first monomer;
wherein during said copolymerization an ABC block copolymer is formed, wherein said ring-shaped molecule is threaded on block B, and wherein the block B is arranged between said block A and said block C; and
wherein the combined amount of said first monomer and said third monomer having a stopper group is of from 0.1 mol % to 20 mol % based on 100 mol % of the total amount of polymerizable monomers.

According to step (b) of the method described in the preceding paragraph the first monomer having a stopper group is polymerized to form a block A. Then in step (c) the second monomer is polymerized to the end of the block A to form the block B. Finally in step (d) the third monomer having a stopper group is polymerized to the end of the block B. Therefore, by polymerizing the second polymer to the end of the block A and then polymerizing the third polymer to the end of the block B, a block copolymer having the block sequence ABC is formed, wherein the block A and the block C are formed from a monomer having a stopper group, and wherein the block B is formed from the second monomer. Since the second monomer is complexed by the ring-shaped molecule, the ring-shaped molecule is threaded on the block B. Regarding the first monomer having a stopper group and the second monomer having a stopper group, the first monomer and the second monomer may be same or different. In case that the first monomer and the third monomer are the same, block C may also be denoted as block A. Preferably, the polymerization steps (b), (c) and (d) are performed in a one-pot procedure. More preferably, the whole block copolymerization is performed as a one-pot procedure. This means that intermediate products are not isolated from the reaction mixture. The block copolymerization of this embodiment may be, as non-limiting examples, performed as free radical polymerization, as atom transfer radical polymerization (ATRP), or as reversible addition fragmentation chain transfer radical polymerization (RAFT polymerization).

Also in case that an ABC block copolymer is formed, the combined amount of the first and the third monomer having a stopper group is in general in the range of from 0.1 mol % to 20 mol % based on 100 mol % of the total amount of polymerizable monomers for the reasons set out herein above. In particular, the combined amount of the first and the third monomer having a stopper group in general does not exceed 20 mol % based on 100 mol % of the total amount of polymerizable monomers in order to provide polyrotaxanes which are able to form mobile gels and slide ring gels useful as self-healing materials, surface coatings, adhesives and paints as described and explained herein.

In an embodiment of the method wherein a polyrotaxane is formed comprising a copolymer having said block A, said block B and said block C and wherein said block C is formed by polymerizing the second monomer to the block A and polymerizing the third monomer to the block B, the combined amount of said first monomer and said third monomer having a stopper group is of from 0.5 mol-% to 18 mol-% based on 100 mol-% of the total amount of polymerizable monomers. Preferably, the combined amount of said first monomer and said third monomer having a stopper group is of from 1 mol % to 16 mol % based on 100 mol-% of the total amount of polymerizable monomers. More preferably, the combined amount of said first monomer and said third monomer having a stopper group is of from 2 mol % to 15 mol % based on 100 mol-% of the total amount of polymerizable monomers.

Even more preferably, the combined amount of said first monomer and said third monomer having a stopper group is of from 3 mol % to 12 mol % based on 100 mol-% of the total amount of polymerizable monomers. Most preferably, the combined amount of said first monomer and said third monomer having a stopper group is of from 5 mol % to 11 mol % based on 100 mol-% of the total amount of polymerizable monomers. Also in these embodiments the first monomer having a stopper group and the third monomer having a stopper group may be same or different.

Preferably, in some embodiments of any one of the methods of preparing a polyrotaxane described herein the ring-shaped molecule is threaded on the main chain of the copolymer. This means that in preferred embodiments of the method a main-chain polyrotaxane is formed.

Preferably, in the embodiments of the methods of preparing a polyrotaxane described herein radical polymerization or copolymerization is performed using a radical initiator. In some embodiments a radical initiator is comprised in the composition provided in step (a). In particular, the term "initiator" or "radical initiator" as used herein denotes a reactive molecule which is capable of starting a polymerization. In general, in a polymerization the initiator may be used in low amounts compared to the amount of the monomer(s). The initiator may contribute a constitutional unit to the polymer.

In some embodiments of the methods described herein the composition provided in step (a) is deoxygenated before being subjected to polymerization. By deoxygenation oxygen is at least partially, preferably substantially completely removed from the composition since otherwise oxygen may promote oxidation of the radical species during the copolymerization and therefore act as an inhibitor.

In some embodiments of the methods of preparing a polyrotaxane the polymerization is initiated thermally and/or photochemically, in particular in case that the radical polymerization is performed using a radical initiator. In one embodiment the polymerization is initiated thermally. In another embodiment the polymerization is initiated photochemically. In still another embodiment the polymerization is initiated thermally and photochemically. With this regard, the radical initiators used for thermal and/or photochemical initiation are not particularly limited, and the person skilled in the art may appropriately select and use any radical initiator suitable for thermal initiation and/or any radical initiator suitable for thermal initiation. Suitable radical initiators are, for example, selected from the group consisting of a persulfate, hydrogenperoxide, an organic peroxide, an azoinitiator, and any combination thereof.

In some embodiments the polymerization is accelerated by adding an accelerator for radical initiation. Accelerators for radical initiation which can be suitably used in the context of the present invention are, for example, selected from the group consisting of a thiosulfate, a metabisulfite, N,N,N',N'-tetramethylethylene diamine or a salt thereof, ethylenediaminetetraacetic acid or a salt thereof, a peroxidase enzyme, and any combination thereof.

A variety of ring-shaped molecules used in polyrotaxanes may be employed in the methods of preparing a polyrotaxane disclosed herein. For example, the ring-shaped molecule may be a crown ether, a cucurbit[n]uril, a calixarene, a cyclic amide and/or a transition metal complex. However, in some particularly preferred embodiments of the methods of the present invention the ring-shaped molecule is selected from the group consisting of a cyclodextrin, a cyclodextrin derivative and any combination thereof. In one embodiment the ring-shaped molecule is a cyclodextrin. In another embodiment the ring-shaped molecule is a cyclodextrin derivative. In some embodiments of the method a cyclodextrin and a cyclodextrin derivative are used in combination. As known to a person skilled in the art the term "cyclodextrin" denotes a cyclic oligosaccharide compound. As non-limiting examples, such cyclic oligosaccharide compounds may comprise six saccharide unites (α-cyclodextrin), seven saccharide units ((3-cyclodextrin), or eight saccharide units (γ-cyclodextrin).

In some embodiments the cyclodextrin or cyclodextrin derivative is selected from the group consisting of a native cyclodextrin, a methylated cyclodextrin, an acetylated cyclodextrin, a hydroxyethylated cyclodextrin, a hydroxypropylated cyclodextrin, a cationic cyclodextrin derivative, an anionic cyclodextrin derivative, a glucosylated cyclodextrin, a chemically reactive cyclodextrin derivative, and any combination thereof. In some embodiments the cyclodextrin or cyclodextrin derivative is selected from the group consisting of α-cyclodextrin, randomly methylated α-cyclodextrin, β-cyclodextrin, randomly methylated β-cyclodextrin (RAMEB), hydroxypropyl β-cyclodextrin, acetyl β-cyclodextrin, heptakis(2,6-di-O-methyl)-β-cyclodextrin, carboxymethyl-β-cyclodextrin, succinyl-β-cyclodextrin, (2-carboxyethyl)-β-cyclodextrin, β-cyclodextrin, sulfobutylated β-cyclodextrin, β-cyclodextrin sulfate, 6-monodeoxy-6monoamino-β-cyclodextrin hydrochloride, heptakis-6-deoxy-6-amino)-β-cyclodextrin, (2-hydroxy-3-N,N,N-trimethyla mino)propyl-β-cyclodextrin, heptakis(2,6-tri-O-methyl)-β-cyclodextrin, mono-amino-β-cyclodextrin, sulfobutyl-β-cyclodextrin, γ-cyclodextrin, randomly methylated γ-cyclodextrin, a 2-hydroxy-3-N,N,N-trimethylaminopropyl-β-cyclodextrin halide, any salts thereof, and any combination thereof. In some embodiments said cyclodextrin or cyclodextrin derivative is an ionic cyclodextrin or an ionic cyclodextrin derivative selected from the group consisting of carboxymethyl-α-cyclodextrin sodium salt, carboxymethyl-β-cyclodextrin sodium salt, succinyl-α-cyclodextrin, succinyl-β-cyclodextrin, succinyl-γ-cyclodextrin, (2-carboxyethyl)-α-cyclodextrin, (2-Carboxyethyl)-β-cyclodextrin, α-cyclodextrin phosphate sodium salt, β-cyclodextrin phosphate sodium salt, γ-cyclodextrin phosphate sodium salt, sulfobutylated β-cyclodextrin sodium salt, sulfobutylated β-cyclodextrin sodium salt, sulfobutylated β-cyclodextrin sodium salt, α-cyclodextrin sulfate sodium salt, β-cyclodextrin sulfate sodium salt, γ-cyclodextrin sulfate sodium salt, 6-monodeoxy-6-monoamino-β-cyclodextrin hydrochloride, heptakis(6-deoxy-6-amino)-β-cyclodextrin heptahydrochloride, octakis(6-deoxy-6-amino)-γ-cyclodextrin octahydrochloride, (2-hydroxy-3-N,N,N-trimethylamino)propyl-β-cyclodextrin chloride, and any combination thereof.

In a preferred embodiment the cyclodextrin derivative is randomly methylated β-cyclodextrin (RAMEB). RAMEB, also called methyl-β-cyclodextrin (CAS Number 128446-36-6), is produced in industrial scale from β-cyclodextrin. The methyl substituents are randomly distributed between the hydroxyl groups of positions 2, 3 and 6 at each of the anhydroglucose units. The average degree of substitution (DS) per anhydroglucose unit depends on the producer and ranges between 1.3 and 2.3, preferably between 1.6 and 2.0. As an advantage, the solubility of RAMEB and its inclusion compounds in water is superior to the solubility of native β-cyclodextrin. β-cyclodextrin, in which all hydroxyl groups are unsubstituted, may be also denoted as "native β-cyclodextrin".

The first monomer is not particularly limited as far as the first monomer has a stopper group having sufficient steric bulk in order to block the movability of the ring-shaped molecule along the copolymer and to prevent the ring-shaped molecule from disassembling from the copolymer chain. Preferably, the first monomer having a stopper group is a vinyl monomer. The term "vinyl monomer" as used throughout this whole description in general denotes a monomer having a vinyl group. With this regard, the term "vinyl group" indicates the group —CH=CH$_2$. Optionally, the vinyl group can bear one or more substituent in place of any one of the hydrogen atoms, such as, for example, the methyl group in a poly(ethylene glycol) methacrylate. Preferably, the first monomer has a molecular weight of 70 g/mol or more. Accordingly, in some embodiments of the methods of preparing a polyrotaxane the first monomer having a stopper group may have a molecular weight of from 70 g/mol to 1000 g/mol, preferably of from 100 g/mol to 500 g/mol.

In some embodiments said first monomer is selected from the group consisting of myrcene, an aromatic vinyl monomer, N-isopropyl (meth)acrylamide, N-vinylcaprolactam, N-vinylimidazole, a poly(ethylene glycol) (meth)acrylate, an α,ω-bis(meth)acrylate, and any combination thereof. In case that the first monomer is a poly(ethylene glycol) (meth)acrylate the molecular weight of the poly(ethylene glycol) unit is preferably below 3000 g/mol. More preferably, in case that the first monomer is a poly(ethylene glycol) (meth)acrylate the molecular weight of the poly(ethylene glycol) unit is below 1000 g/mol. In an embodiment the first monomer is poly(ethylene glycol) methyl ether (meth)acrylate. In an embodiment the first monomer is hydroxyethyl (meth)acrylate. In some embodiments, wherein the first monomer having a stopper group is an aromatic vinyl monomer, said aromatic vinyl monomer is selected from the group consisting of optionally substituted styrene, optionally substituted styrenesulfonic acid, optionally substituted vinylpyridine, optionally substituted divinyl benzene, and any combination thereof. The term "optionally substituted" as referred to in the context of optionally substituted styrene, optionally substituted styrenesulfonic acid, optionally substituted vinylpyridine and optionally substituted divinyl benzene denotes one or more substituents independently selected from the group consisting of hydrogen, C1-C10 alkyl, C1-C10 heteroalkyl, C1-C10 haloalkyl, C1-C10 alkoxy, CN, nitro, halogen (F, Cl, Br, I), and the like. For example, In one embodiment the aromatic vinyl monomer is 4-(trifluoromethyl)styrene. In case that an $\alpha,\omega$-bis(meth)acrylate is used, in embodiments said $\alpha,\omega$-bis(meth)acrylate is an $\alpha,\omega$-bis(meth)acrylate of ethylene glycol, oligoethylene glycol, poly(ethylene glycol), bisphenol A and any mixtures thereof. In case that the $\alpha,\omega$-bis(meth)acrylate is an $\alpha,\omega$-bis(meth)acrylate of poly(ethylene glycol) the molecular weight of the poly(ethylene glycol) unit is preferably below 3000 g/mol. More preferably, in case that the $\alpha,\omega$-bis(meth)acrylate is an $\alpha,\omega$-bis(meth)acrylate of poly(ethylene glycol) the molecular weight of the poly(ethylene glycol) unit is below 1000 g/mol. The term "(meth)acrylate" as used in any context throughout the present disclosure covers both acrylate and methacrylate.

Also the second monomer is not particularly limited as far as the second monomer is capable of forming a section of the copolymer having a substantially linear structure. Hence, the second monomer may be a substantially linear monomer. As noted above, the term "substantially linear" does not exclude that such section is branched as far as the section having a substantially linear structure can thread the ring-shaped molecule in such a manner that the ring-shaped molecule is rotatable and exhibits movability along the section. Consequently, the second monomer may be branched, preferably only slightly branched, as far as said branching does not prevent rotatability and movability of the ring-shaped molecule along the copolymer. Preferably, the second monomer is a vinyl monomer. More preferably, both the first monomer having a stopper group and the second monomer are vinyl monomers. Preferably, in any one of the methods disclosed herein, the second monomer has a molecular weight of 120 g/mol or less, more preferably of 110 g/mol or less.

In any one of the methods described herein the second monomer may be a non-ionic monomer. Preferably, the term "non-ionic monomer" as used herein denotes a monomer having no charged functionalities when being in an aqueous solution having a pH in a range of from 2 to 11, more preferably of from 3 to 10. The term "non-ionic monomer" as used herein encompasses, for example, monomers having only structural units and/or functional groups which are not capable of forming ions, such as, for example, isoprene or methyl methacrylate. In addition, the term non-ionic monomer may also encompass monomers having a functional group which is generally capable of forming ions, such as, for example, a carboxylic acid group, but which is in an uncharged state when being in an aqueous solution having a pH in a range of from 2 to 11, more preferably of from 3 to 10. Examples for such non-ionic monomers, which are uncharged within such a range of pH are acrylic acid and derivatives thereof having a carboxylic acid group, such as, for example, methacrylic acid.

Preferably, in some embodiments of the methods of preparing a polyrotaxane disclosed herein the second monomer is a hydrophobic monomer. In particular, the second monomer is a non-ionic, hydrophobic monomer. As referred to herein in the context of any one of the methods of preparing a polyrotaxane and any polyrotaxane, the term "hydrophobic monomer" denotes a monomer being insoluble in water or being sparingly soluble in water. For purposes of the methods of preparing a polyrotaxane and the polyrotaxanes described herein, the hydrophobic monomer preferably has a solubility in water at 20° C. of less than 20 g/l, more preferably of less than 10 g/l, still more preferably of less than 5 g/l and most preferably of less than 2 g/l. Non-ionic monomers, in particular hydrophobic monomers are preferred in case that a cyclodextrin or cyclodextrin derivative is used as the ring-shaped molecule. It has so far been difficult to thread cyclodextrins on hydrophobic polymer chains, such as, for example, polyisoprene or polybutadiene chains, to obtain a polyrotaxane. Applying the methods disclosed herein wherein the second monomer is complexed with a cyclodextrin and then copolymerized, a polyrotaxane comprising a hydrophobic copolymer chain, such as, for example, a polyisoprene- or polybutadiene-containing copolymer chain, is easily obtained. In some embodiments the second monomer is selected from the group of vinyl monomers having a molecular weight less than 120 g/mol. Preferably, the second monomer is selected from the group of vinyl monomers having a molecular weight less 110 g/mol. In addition or alternatively, the second monomer may be selected from the group of vinyl monomers consisting of a 1,3-diene, a 1,3,5-triene, a (meth)acrylate, a vinyl ester, a vinyl-ether, (meth)acrylonitrile, (meth)acrylic acid, (meth)acrylamide, and any combination thereof. In case that the second monomer is a 1,3-diene, said 1,3 diene is preferably selected from 1,3-butadiene, a derivative of 1,3-butadiene, isoprene, and any combination thereof. Hence, in one embodiment 1,3-butadiene is used. In one embodiment isoprene is used. In another embodiment 1,3-butadiene and isoprene are used in combination. In one embodiment the 1,3-diene is dimethyl butadiene. In case that the second monomer is a vinyl ester, in some embodiments the vinyl ester is vinyl acetate. In case that the second monomer is a vinyl ether, in some embodiments said vinyl ether is methyl-vinyl ether. In case that the second monomer is a (meth)acrylate, said (meth)acrylate is selected from the group consisting of methyl acrylate, methyl methacrylate and any combination thereof. Hence, in one embodiment the second monomer is methyl acrylate. In one embodiment the second monomer is methyl methacrylate. In another embodiment methyl acrylate and methyl methacrylate are used in combination. The term "(meth)acrylonitrile" as used in any context throughout the present disclosure covers both acrylonitrile and methacrylonitrile. The term "(meth)acrylic acid" as used in any context throughout the present disclosure covers both acrylic acid and methacrylic acid. The term "(meth)acrylamide" as used in any context throughout the present disclosure covers both acrylamide and methacrylamide.

In a preferred embodiment of any one of the methods of preparing a polyrotaxane disclosed herein the first monomer having a stopper group is poly(ethylene glycol) methyl ether methacrylate, the second monomer is isoprene and the ring-shaped molecule is selected from a cyclodextrin, a cyclodextrin derivative and any combination thereof. Preferably, in this embodiment the ring-shaped molecule is randomly methylated β-cyclodextrin (RAMEB). Furthermore, in this embodiment randomly methylated β-cyclodextrin (RAMEB) and 2-Hydroxy-3-N,N,N-trimethylamino) propyl-β-cyclodextrin chloride, a cationic ring-shaped molecule, may be used in combination. These combinations of monomers and ring-shaped molecules may be used in any method described herein which leads to the formation of a random copolymer. Preferably, when such monomers are used, the radical copolymerization is carried out in an aqueous medium, more preferably in water.

In another preferred embodiment of any one of the methods of preparing a polyrotaxane described herein the first monomer having a stopper group is styrene, the second monomer is isoprene and the ring-shaped molecule is selected from a cyclodextrin, a cyclodextrin derivative and any combination thereof. Preferably, in this embodiment the ring-shaped molecule is randomly methylated β-cyclodextrin (RAMEB). This combination of monomers and ring-shaped molecules may be used in any method described herein which leads to the formation of a random copolymer. Preferably, when such monomers are used, the radical copolymerization is carried out in an aqueous medium, more preferably in water.

In another preferred embodiment of any one of the methods of preparing a polyrotaxane disclosed herein the first monomer having a stopper group is myrcene, the second monomer is isoprene and the ring-shaped molecule is selected from a cyclodextrin, a cyclodextrin derivative and any combination thereof. Preferably, in this embodiment the ring-shaped molecule is randomly methylated β-cyclodextrin (RAMEB). This combination of monomers and ring-shaped molecules may be used in any method described herein which leads to the formation of a random copolymer or of a block copolymer. Preferably, when such monomers are used, the radical copolymerization is carried out in an aqueous medium, more preferably in water.

In another preferred embodiment of any one of the methods of preparing a polyrotaxane as described herein the first monomer having a stopper group is poly(ethylene glycol) monomethacrylate (PEGMA), the second monomer is isoprene and the ring-shaped molecule is selected from a cyclodextrin, a cyclodextrin derivative and any combination thereof. Preferably, in this embodiment the ring-shaped molecule is randomly methylated β-cyclodextrin (RAMEB). This combination of monomers and ring-shaped molecules may be used in any method described herein which leads to the formation of a random copolymer. Preferably, when such monomers are used, the radical copolymerization is carried out in an aqueous medium, more preferably in water.

In another preferred embodiment of any one of the methods of preparing a polyrotaxane as described herein the first monomer having a stopper group is styrene, the second monomer is methyl acrylate and the ring-shaped molecule is selected from a cyclodextrin, a cyclodextrin derivative and any combination thereof. Preferably, in this embodiment the ring-shaped molecule is randomly methylated β-cyclodextrin (RAMEB). This combination of monomers and ring-shaped molecules may be used in any method described herein which leads to the formation of a random copolymer. Preferably, when such monomers are used, the radical copolymerization is carried out in an aqueous medium, more preferably in water.

In another preferred embodiment of any one of the methods of preparing a polyrotaxane as described herein the first monomer having a stopper group is poly(ethylene glycol) methyl ether methacrylate, the second monomer is dimethyl butadiene and the ring-shaped molecule is selected from a cyclodextrin, a cyclodextrin derivative and any combination thereof. Preferably, in this embodiment the ring-shaped molecule is randomly methylated β-cyclodextrin (RAMEB). This combination of monomers and ring-shaped molecules may be used in any method described herein which leads to the formation of a random copolymer. Preferably, when such monomers are used, the radical copolymerization is carried out in an aqueous medium, more preferably in water.

In another preferred embodiment of any one of the methods of preparing a polyrotaxane as described herein the first monomer having a stopper group is hydroxyethyl methacrylate, the second monomer is isoprene and the ring-shaped molecule is selected from a cyclodextrin, a cyclodextrin derivative and any combination thereof. Preferably, in this embodiment the ring-shaped molecule is β-cyclodextrin. This combination of monomers and ring-shaped molecules may be used in any method described herein which leads to the formation of a random copolymer. Preferably, when such monomers are used, the radical copolymerization is carried out in an aqueous medium, more preferably in water.

In another preferred embodiment of any one of the methods of preparing a polyrotaxane as described herein the first monomer having a stopper group is poly(ethylene glycol) methyl ether methacrylate, the second monomer is isoprene and the ring-shaped molecule is a hydroxypropylated cyclodextrin. Preferably, in this embodiment the ring-shaped molecule is hydroxypropyl-β-cyclodextrin. This combination of monomers and ring-shaped molecules may be used in any method described herein which leads to the formation of a random copolymer. Preferably, when such monomers are used, the radical copolymerization is carried out in an aqueous medium, more preferably in water.

According to preferred embodiments of the methods of preparing a polyrotaxane disclosed herein the copolymerization is performed in an aqueous medium. For example, the aqueous medium is an aqueous solution or suspension. Preferably, the copolymerization is performed in water. In particular, performing the copolymerization in an aqueous medium is preferred in case that the ring-shaped molecule is selected from the group consisting of a cyclodextrin, a cyclodextrin derivative and any combination thereof. Without wishing to be bound by any theory it is assumed that water assists in forming a complex of a cyclodextrin or cyclodextrin derivative and the second polymerizable monomer, in particular in case that the second monomer is a non-ionic monomer, preferably a hydrophic monomer.

In embodiments of the methods of preparing a polyrotaxane described herein, in particular in case that the copolymerization is performed in an aqueous medium, said copolymerization is performed using a water-soluble radical initiator. In some embodiments said water soluble radical initiator is selected from the group consisting of a persulfate, hydrogenperoxide, organic peroxides, a hydrophilic azoinitiator, a water-soluble complex of an azoinitiator with a cyclodextrin or cyclodextrin derivative, and any combination thereof. In one embodiment a water-soluble complex of an azoinitiator with a cyclodextrin is used. In one embodiment a water-soluble complex of an azoinitiator with a cyclodextrin derivative is used. In another embodiment a water-soluble complex of an azoinitiator with a cyclodextrin and a water-soluble complex of an azoinitiator with a cyclodextrin derivative are used in combination. In some embodiments the water-soluble radical initiator is selected from the group consisting of a peroxodisulfate, tert-butyl hydroperoxide, 2,2'-azobis[2-(2-imidazolin-2-yl)propane] dihydrochloride, azobis-isobutyramidine, 4,4'-Bis(dimethylamino)benzophenone, and any combination thereof. The radical initiators which may be used are not limited to initiators explicitly mentioned herein, and the skilled person knows how to select a suitable initiator for performing the methods of preparing a polyrotaxane disclosed herein. Suitable initiators are, for example, disclosed in Polymer Handbook, 4$^{th}$ edition, by J. Barndrup, E. H. Immergut, E. A.

Grulke, John Wiley and Sons, Inc., 1999, pp. II/2-II/69. Combinations of initiators disclosed in this reference can be suitably used as well.

Further to using a radical initiator, in particular in case that a water-soluble radical initiator is used, in some embodiments an accelerator for radical initiation is used. For example, said accelerator for radical initiation is selected from the group consisting of a thiosulfate, a metabisulfite, N,N,N',N'-tetramethylethylene diamine or a salt thereof, ethylenediaminetetraacetic acid or a salt thereof, a peroxidase enzyme, and any combination thereof. As known to a person skilled in the art an accelerator for radical initiation may, for example, interact with a radical initiator to form a so-called redox-initiator. However, other mechanisms of interaction of an accelerator for radical initiation with a radical initiator may occur as well. Further, the accelerator for radical initiation is not limited to the aforementioned specific examples. With this regard, for example, any accelerator for radical initiation described in A. S. Sarac, Prog. Polym. Sci. 1999, 24, 1149-1204 may be appropriately selected and used by a person skilled in the art.

In some embodiments the copolymerization of any one of the methods of preparing a polyrotaxane described herein is carried out using a chain transfer agent. Chain transfer agents are in particular used in case that the copolymerization is carried out employing a RAFT-polymerization technique. In some embodiments the chain transfer agent is selected from the group consisting of a dithioester, a xanthate, a dithiocarbamate, a trithiocarbonates, a derivative of any one of the aforementioned chain transfer agents, and any combination thereof. Such chain transfer agents have the following general structures

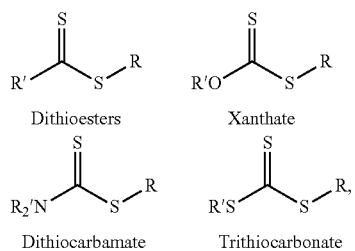

wherein the radicals R and R' may be independently selected from alkyl, aryl and the like and are in particular useful in case that the copolymerization of the methods disclosed herein is performed as RAFT polymerization. As an example, S,S'-bis($\alpha,\alpha'$-dimethyl-$\alpha''$-acetic acid)-trithiocarbonate can be used as chain transfer agent in the methods described herein. As known by a skilled person, in case that the copolymerization is performed in an aqueous medium the chain transfer agent should preferably be soluble in water. In case that a cyclodextrin or a cyclodextrin derivative is used as the ring-shaped molecule, good results can be also achieved in case that the chain transfer agent is solubilized by the cyclodextrin or the cyclodextrin derivative. Without wishing to be bound by any theory, solubilization of the chain transfer agent may be achieved by forming a complex of the chain transfer agent with the cyclodextrin or cyclodextrin derivative. The chain transfer agents which can be used in the methods described herein are not limited to the aforementioned specific examples. Other chain transfer agents, such as those described in C. Barner-Kowollik, Handbook of RAFT Polymerization, Wiley-VCH, 2008, pp. 1-543, may be used.

The technique for performing the radical copolymerization of any one of the methods of preparing a polyrotaxane of the present disclosure is not particularly limited. For example, in some embodiments the radical copolymerization may be carried out using any free radical polymerization technique known to a person skilled in the art.

In some embodiments a controlled radical polymerization technique may be employed. With this regard, in some embodiments the copolymerization is carried out using reversible addition fragmentation chain transfer polymerization (RAFT polymerization). The RAFT polymerization applies chain transfer agents to control the molecular weight and polydispersity. After the initiation, the chain transfer agent can reversibly terminate the growing chains, and the fragment of the chain transfer agent starts new chains. The RAFT polymerization technique can depress the free radical concentration at any given time which results in the character of the polymerization as living polymerization. Suitable RAFT polymerization techniques are generally known to a person skilled in the art and can, for example, be found in the Handbook of RAFT Polymerization, C. Barner-Kowollik (Ed.), Wiley-VCH, Weinheim, 2008.

In other embodiments the copolymerization is carried out using atom transfer radical polymerization (ATRP). Also ATRP represents a living polymerization technique. ATRP, also if applied in the methods of preparing a polyrotaxane described herein, uses an organohalide as initiator and a metal-ligand complex as catalyst. The transfer of the halogen atom between the initiator, the propagating chain and the catalyst provides a low concentration of the radicals at a given time. ATRP techniques are known to a person skilled in the art and are appropriately selected. For example, suitable ATRP techniques are described in K. Matyjaszewski, J. H. Xia, Chem. Rev. 2001, 101, 2921-2990. In some embodiments, in particular in case that the copolymerization is carried out in an aqueous medium, a combination of an initiator and a catalyst for said atom transfer radical polymerization is selected from the group consisting of a combination of a water-soluble initiator and catalyst, a combination of an initiator and a catalyst solubilized by cyclodextrins, and any combination thereof. In one embodiment the combination of an initiator and a catalyst for ATRP is a combination of a water-soluble initiator and a catalyst. In one embodiment the combination of an initiator and a catalyst for ATRP is a combination of an initiator and a catalyst solubilized by cyclodextrins. In other embodiments a combination of a water-soluble initiator and a catalyst is used in combination with a combination of an initiator and a catalyst solubilized by cyclodextrins. For example, the combination of a water-soluble initiator and a catalyst may be selected from the group consisting of a combination of a hydrophilic 2-halogeno-isobutyrate or a hydrophilic 2-halogenopropionate, a Cu(I) salt and a chelating diamine, a combination of a hydrophilic 2-halogeno-isobutyrate or a hydrophilic 2-halogenopropionate and a redox enzyme, and any combination thereof. In an embodiment the combination of a water-soluble initiator and a catalyst is a combination of a hydrophilic 2-halogeno-isobutyrate a Cu(I) salt and a chelating diamine. In an embodiment the combination of a water-soluble initiator and a catalyst is a combination of a hydrophilic 2-halogenopropionate, a Cu(I) salt and a chelating diamine. In an embodiment the combination of a water-soluble initiator and a catalyst is a combination of a hydrophilic 2-halogeno-isobutyrate and a redox enzyme. In an embodiment the combination of a water-soluble initiator and a catalyst is a combination of a hydrophilic 2-halogenopropionate and a redox enzyme. In other embodiments combinations of these combinations of a water-soluble initiator and a catalyst are used. In some embodiments the hydrophilic 2-halogeno-isobutyrate is hydroxyethyl-2-bromoisobutyrate. In some embodiments the chelating diamine is selected from the group consisting of ethylenediamine, 2,2'-bipyridine (bpy), 4,4'-di(5-nonyl)-2,2'-bipyridine (dNbpy), N,N,N',N'-tetramethylethylenediamine (TMEDA), N-propyl(2-pyridyl)methanimine (NPrPMI), 2,2':6',2"-terpyridine (tpy), 4,4',4"-tris(5-nonyl)-2,2':6',2"-terpyridine (tNtpy), N,N,N',N",N"-pentamethyldiethylenetriamine (PMDETA), N,N-bis(2-pyridylmethyl)octylamine (BPMOA), 1,1,4,7,10,10-hexamethyl-triethylene-tetramine (HMTETA), tris[2-(dimethylamino)ethyl]amine (Me$_6$TREN), tris[(2-pyridyl)methyl]amine (TPMA), 1,4,8,11-tetraaza-1,4,8,11-tetra methylcyclotetradeca ne (Me4CYCLAM,N,N,N'N'-tetrakis(2-pyridylmethyl)ethylenediamine (TPEN), diethylenetriamine (DETA), triethylenetetramine (TETA), N,N-bis(2-pyridylmethyl)amine (BPMA), tris[2-aminoethyl]amine (TREN) 1,4,8,11-tetraazacyclotetradecane (CYCLAM) N,N,N',N'-tetrakis(2-pyridylmethyl)ethylenediamine (TPEN), N,N,N',N",N"-pentamethyldiethylenetriamine. Any combination of the aforementioned chelating diamines may be used. In some embodiments the redox enzyme is hemoglobin. An ATRP method using hemoglobin and being suitable for the copolymerization described herein is, for example, described in T. B. Silva, M. Spulber, M. K. Kocik, F. Seidi, H. Charan, M. Rother, S. J. Sigg, K. Renggli, G. Kali, N. Bruns, Biomacromolecules 2013, 14, 2703-2712.

The temperature at which the copolymerizaion of any one of the methods of preparing a polyrotaxane disclosed herein is performed is not particularly limited and can be appropriately selected by the skilled person. For example, the copolymerization may be performed at a temperature of 80° C. or less. Preferably, the copolymerization is performed at a temperature of 35° C. or less. It is preferred to perform the copolymerization at a temperature of 0° C. or more.

In any one of the methods of preparing a polyrotaxane described herein the polyrotaxane may be isolated using filtration. As an example, ultrafiltration may be used. The polyrotaxane may be heated before filtration. After filtration the polyrotaxane may be dried. Preferably, drying of the polyrotaxane is performed using freeze drying. However, other suitable drying methods may be appropriately selected and applied by a person skilled in the art.

The present invention also relates to a polyrotaxane comprising a ring-shaped molecule and a copolymer threading said ring-shaped molecule, wherein said copolymer is a non-ionic copolymer comprising at least (a) structural units derived from a first polymerizable monomer having a stopper group and at least (b) structural units derived from a second polymerizable monomer, wherein said structural units derived from the first monomer having a stopper group are incorporated into the chain of said copolymer at least partially between the ends thereof, wherein said stopper groups prevent the ring-shaped compound from disassembling from the copolymer, and wherein the amount of said structural units derived from the first monomer having a stopper group is 0.1 mol % to 20 mol % based on 100 mol % of the total amount of structural units of the copolymer.

The copolymer threading the ring-shaped molecule of such a polyrotaxane of the present invention is a non-ionic copolymer, and the first and the second monomer are non-ionic monomers. Preferably, the term "non-ionic monomer" as used herein also with regard to a polyrotaxane denotes a monomer having no charged functionalities when being in an aqueous solution having a pH in a range of from 2 to 11, more preferably of from 3 to 10. The term "non-ionic monomer" as used herein encompasses, for example, monomers having only structural units and/or functional groups which are not capable of forming ions, such as, for example, isoprene or methyl methacrylate. In addition, the term non-ionic monomer may also encompass monomers having a functional group which is generally capable of forming ions, such as, for example, a carboxylic acid group, but which is in an uncharged state when being in an aqueous solution having a pH in a range of from 2 to 11, more preferably of from 3 to 10. Examples for such non-ionic monomers, which are uncharged within such a range of pH are acrylic acid and derivatives thereof having a carboxylic acid group, such as, for example, methacrylic acid. Preferably, the term "non-ionic copolymer" refers to a copolymer which has substantially no structural units comprising functionalities which are charged when being in an aqueous solution having a pH range of from 2 to 11, more preferably of from 3 to 10. The term "non-ionic copolymer" as used herein encompasses, for example, copolymers having only structural units and/or functional groups which are not capable of forming ions, such as, for example, structural units derived from isoprene or methyl methacrylate. In addition, the term non-ionic copolymer may also encompass copolymers having structural units and/or functional groups which are generally capable of forming ions, such as, for example, a carboxylic acid group, but which are in an uncharged state when being in an aqueous solution having a pH in a range of from 2 to 11, more preferably of from 3 to 10. Examples for such structural units which are uncharged within such a range of pH are structural units derived from acrylic acid and derivatives thereof having a carboxylic acid group, such as, for example, methacrylic acid. With regard to a non-ionic copolymer, "having substantially no structural units comprising functionalities which are charged when being in an aqueous solution in a pH range of from 2 to 11, more preferably of from 3 to 10" preferably means that structural units comprising functionalities which are charged when being in an aqueous solution in a pH range of from 2 to 11, more preferably of from 3 to 10 are only present in the copolymer in minor amounts. For example, such structural units comprising functionalities which are charged when being in an aqueous solution in a pH range of from 2 to 11, more preferably of from 3 to 10 may derive from impurities of the monomers to be copolymerized, or from reactants used in the copolymerization reaction, such as, for example, initiators, catalysts and/or chain transfer agents, or also from ionic monomers that have been intentionally added to the reaction mixture. Preferably, the amount of structural units comprising functionalities which are charged when being in an aqueous solution in a pH range of from 2 to 11, more preferably of from 3 to 10 is less than 5 mol %, more preferably less than 3 mol %, still more preferably less than 2 mol %, most preferably less than 1 mol %, each based on 100 mol-% of the structural units of the copolymer.

In preferred embodiments of the polyrotaxane of the present invention, the polyrotaxane is obtainable or is obtained by any one of the methods of the present invention described herein.

In one embodiment of the polyrotaxane of the present invention, said copolymer is a random copolymer, wherein said structural units derived from said first polymerizable monomer having a stopper group are incorporated randomly along the chain of said copolymer at least partially between the ends thereof.

In some embodiments of the polyrotaxane of the present invention the amount of said structural units derived from a first monomer having a stopper group is of from 0.5 mol % to 18 mol % based on 100 mol % of the total amount of structural units of the copolymer. Preferably, the amount of said structural units derived from a first monomer having a stopper group is of from 1 mol % to 16 mol % based on 100 mol % of the total amount of structural units of the copolymer. More preferably, the amount of said structural units derived from a first monomer having a stopper group is of from 2 mol % to 15 mol % based on 100 mol % of the total amount of structural units of the copolymer. Even more preferably, the amount of structural units derived from said first monomer having a stopper group is of from 3 mol % to 12 mol % based on 100 mol % of the total amount of structural units of the copolymer. Most preferably, the amount of said structural units derived from a first monomer is of from 5 mol % to 11 mol % based on 100 mol % of the total amount of structural units of the copolymer.

In another embodiment of the polyrotaxane of the present invention said copolymer is a block copolymer comprising a block A comprising repeating units derived from said first polymerizable monomer having a stopper group, a block B comprising repeating units derived from said second polymerizable monomer, and a block C comprising repeating units derived from a third polymerizable monomer, wherein said repeating units derived from said third monomer are same or different from said repeating units derived from said first monomer, wherein in said block copolymer said block B is arranged between said block A and said block C, wherein said ring-shaped molecule is threaded on block B, and wherein the combined amount of said structural units derived from said first monomer and said structural units derived from said third monomer is of from 0.1 mol % to 20 mol % based on 100 mol % of the total amount of structural units of the copolymer. In case that the repeating units derived from the third monomer in block C and the repeating units derived from the first monomer in block A are the same, block C may be also denoted as block A.

In an embodiment of the polyrotaxane comprising a block copolymer having said block A, said block B and said block C, the combined amount of structural units derived from said first monomer and said structural units derived from said third monomer having a stopper group is of from 0.5 mol-% to 18 mol-% based on 100 mol-% of the total amount of structural units of the copolymer. Preferably, the combined amount of said structural units derived from said first monomer and said structural units derived from said third monomer having a stopper group is of from 1 mol % to 16 mol % based on 100 mol-% of the total amount of structural units of the copolymer. More preferably, the combined amount of said structural units derived from said first monomer and said structural units derived from said third monomer having a stopper group is of from 2 mol % to 15 mol % based on 100 mol-% of the total amount of structural units of the copolymer. Even more preferably, the combined amount of said structural units derived from said first monomer and said structural units derived from said third monomer having a stopper group is of from 3 mol % to 12 mol % based on 100 mol-% of the total amount of structural units of the copolymer. Most preferably, the combined amount of structural units derived from said first monomer and structural units derived from said third monomer having a stopper group is of from 5 mol % to 11 mol % based on 100 mol-% of the total amount of structural units of the copolymer. Also in these embodiments the first monomer having a stopper group and the third monomer having a stopper group may be same or different.

Preferably, in some embodiments of the polyrotaxane described herein the ring-shaped molecule is threaded on the main chain of the copolymer. This means that in preferred embodiments the polyrotaxane is a main-chain polyrotaxane.

A variety of ring-shaped molecules generally used in polyrotaxanes may be employed in the polyrotaxanes described herein. For example, the ring-shaped molecule may be a crown ether, a cucurbit[n]uril, a calixarene, a cyclic amide and/or a transition metal complex. However, in some particularly preferred embodiments of the polyrotaxane of the present invention the ring-shaped molecule is selected from the group consisting of a cyclodextrin, a cyclodextrin derivative and any combination thereof. In one embodiment the ring-shaped molecule is a cyclodextrin. In another embodiment the ring-shaped molecule is a cyclodextrin derivative. In some embodiments of the polyrotaxane a cyclodextrin and a cyclodextrin derivative are used in combination.

In some embodiments of the polyrotaxanes disclosed herein the cyclodextrin or cyclodextrin derivative is selected from the group consisting of a native cyclodextrin, a methylated cyclodextrin, an acetylated cyclodextrin, a hydroxyethylated cyclodextrin, a hydroxypropylated cyclodextrin, a cationic cyclodextrin derivative, an anionic cyclodextrin derivative, a glucosylated cyclodextrin, a chemically reactive cyclodextrin derivative, and any combination thereof. In further embodiments the cyclodextrin or cyclodextrin derivative is selected from the group consisting of α-cyclodextrin, randomly methylated α-cyclodextrin, β-cyclodextrin, randomly methylated β-cyclodextrin (RAMEB), hydroxypropyl β-cyclodextrin, acetyl β-cyclodextrin, heptakis(2,6-di-O-methyl)-β-cyclodextrin, carboxymethyl-β-cyclodextrin, succinyl-β-cyclodextrin, (2-carboxyethyl)-β-cyclodextrin, β-cyclodextrin, sulfobutylated β-cyclodextrin, β-cyclodextrin sulfate, 6-monodeoxy-6monoamino-β-cyclodextrin hydrochloride, heptakis-6-deoxy-6-amino)-β-cyclodextrin, (2-hydroxy-3-N,N,N-trimethylamino)propyl-β-cyclodextrin, heptakis(2,6-tri-O-methyl)-β-cyclodextrin, mono-amino-β-cyclodextrin, sulfobutyl-β-cyclodextrin, γ-cyclodextrin, randomly methylated γ-cyclodextrin, a 2-hydroxy-3-N,N,N-trimethylaminopropyl-β-cyclodextrin halide, any salts thereof, and any combination thereof. In still further embodiments said cyclodextrin or cyclodextrin derivative is an ionic cyclodextrin or an ionic cyclodextrin derivative selected from the group consisting of carboxymethyl-α-cyclodextrin sodium salt, carboxymethyl-β-cyclodextrin sodium salt, succinyl-α-cyclodextrin, succinyl-β-cyclodextrin, succinyl-γ-cyclodextrin, (2-carboxyethyl)-α-cyclodextrin, (2-Carboxyethyl)-β-cyclodextrin, α-cyclodextrin phosphate sodium salt, β-cyclodextrin phosphate sodium salt, γ-cyclodextrin phosphate sodium salt, sulfobutylated β-cyclodextrin sodium salt, sulfobutylated β-cyclodextrin sodium salt, sulfobutylated β-cyclodextrin sodium salt, α-cyclodextrin sulfate sodium salt, β-cyclodextrin sulfate sodium salt, γ-cyclodextrin sulfate sodium salt, 6-monodeoxy-6-monoamino-β-cyclodextrin hydrochloride, heptakis(6-deoxy-6-amino)-β-cyclodextrin heptahydrochloride, octakis(6-deoxy-6-amino)-γ-cyclodextrin octahydrochloride, (2-hydroxy-3-N,N,N-trimethylamino)propyl-β-cyclodextrin chloride, and any combination thereof. In a preferred embodiment the cyclodextrin derivative is randomly methylated β-cyclodextrin (RAMEB).

The first monomer is not particularly limited as far as the first monomer has a stopper group having sufficient steric bulk in order to block the movability of the ring-shaped molecule along the copolymer and to prevent the ring-shaped molecule from disassembling from the copolymer chain.

Preferably, the first monomer having a stopper group is a vinyl monomer. The term "vinyl monomer" as used also with regard to the polyrotaxanes described herein in general denotes a monomer having a vinyl group. With this regard, the term "vinyl group" indicates the group —CH=CH$_2$. Optionally, the vinyl group can bear one or more substituent in place of any one of the hydrogen atoms, such as, for example, the methyl group in a poly(ethylene glycol) methacrylate. Preferably, the first monomer has a molecular weight of 70 g/mol or more. Accordingly, in some embodiments of the polyrotaxane the first monomer having a stopper group has a molecular weight of from 70 g/mol to 1000 g/mol, preferably of from 100 g/mol to 500 g/mol.

In some embodiments of the polyrotaxanes disclosed herein said first monomer is selected from the group consisting of myrcene, an aromatic vinyl monomer, N-isopropyl (meth)acrylamide, N-vinylcaprolactam, N-vinylimidazole, a poly(ethylene glycol) (meth)acrylate, an α,ω-bis(meth)acrylate, and any combination thereof. In case that the first monomer is a poly(ethylene glycol) (meth)acrylate the molecular weight of the poly(ethylene glycol) unit is preferably below 3000 g/mol. More preferably, in case that the first monomer is a poly(ethylene glycol) (meth)acrylate the molecular weight of the poly(ethylene glycol) unit is below 1000 g/mol. In an embodiment the first monomer is poly (ethylene glycol) methyl ether (meth)acrylate. In an embodiment the first monomer is hydroxyethyl (meth)acrylate In some embodiments, wherein the first monomer having a stopper group is an aromatic vinyl monomer, said aromatic vinyl monomer is selected from the group consisting of optionally substituted styrene, optionally substituted styrenesulfonic acid, optionally substituted vinylpyridine, optionally substituted divinyl benzene, and any combination thereof. The term "optionally substituted" as referred to in the context of optionally substituted styrene, optionally substituted styrenesulfonic acid, optionally substituted vinylpyridine and optionally substituted divinylbenzene denotes one or more substituents independently selected from the group consisting of hydrogen, C1-C10 alkyl, C1-C10 heteroalkyl, C1-C10 haloalkyl, C1-C10 alkoxy, CN, nitro, halogen (F, Cl, Br, I), and the like. In one embodiment the aromatic vinyl monomer is 4-(trifluoromethyl)styrene. In case that an α,ω-bis(meth)acrylate is used, in embodiments said α,ω-bis(meth)acrylate is an α,ω-bis(meth)acrylate of ethylene glycol, oligoethylene glycol, poly(ethylene glycol), bisphenol A and any mixtures thereof. In case that the α,ω-bis(meth)acrylate is an α,ω-bis(meth)acrylate of poly (ethylene glycol) the molecular weight of the poly(ethylene glycol) unit is preferably below 3000 g/mol. More preferably, in case that the α,ω-bis(meth)acrylate is an α,ω-bis (meth)acrylate of poly(ethylene glycol) the molecular weight of the poly(ethylene glycol) unit is below 1000 g/mol.

Regarding the polyrotaxanes described herein, also the second monomer is not particularly limited as far as the second monomer is capable of forming a section of the copolymer having a substantially linear structure. Hence the second monomer may be a substantially linear monomer. As noted above, the term "substantially linear" does not exclude that such section is branched as far as the section having a substantially linear structure can thread the ring-shaped molecule in such a manner that the ring-shaped molecule is rotatable and exhibits movability along the section. Consequently, the second monomer may be branched, preferably only slightly branched, as far as said branching does not prevent rotatability and movability of the ring-shaped molecule along the copolymer. Preferably, the second monomer is a vinyl monomer. More preferably, the first monomer having a stopper group and the second monomer are vinyl monomers. Preferably, in any one of the methods disclosed herein, the second monomer has a molecular weight of 120 g/mol or less, more preferably of 110 g/mol or less.

In the polyrotaxanes described herein the second monomer is a non-ionic monomer. In some embodiments the second monomer is a hydrophobic monomer, in particular a non-ionic, hydrophobic monomer. As referred to herein in the context of any one of the polyrotaxanes, the term "hydrophobic monomer" denotes a monomer being insoluble in water or being only sparingly soluble in water. For purposes of the polyrotaxanes described herein, the hydrophobic monomer preferably has a solubility in water at 20° C. of less than 20 g/l, more preferably of less than 10 g/l, still more preferably of less than 5 g/l and most preferably of less than 2 g/l. Hydrophobic monomers are particularly preferred in case that a cyclodextrin or cyclodextrin derivative is used. In some embodiments the second monomer is selected from the group of vinyl monomers having a molecular weight less than 120 g/mol. Preferably, the second monomer is selected from the group of vinyl monomers having a molecular weight less 110 g/mol. In addition or alternatively, in some embodiments the second monomer is selected from the group of vinyl monomers consisting of a 1,3-diene, a 1,3,5-triene, a (meth)acrylate, a vinyl ester, a vinyl-ether, (meth)acrylonitrile, (meth)acrylic acid, (meth) acrylamide, and any combination thereof. In case that the second monomer is a 1,3-diene, said 1,3 diene is preferably selected from 1,3-butadiene, a derivative of 1,3-butadiene, isoprene, and any combination thereof. Hence, in one embodiment 1,3-butadiene is used. In one embodiment isoprene is used. In another embodiment 1,3-butadiene and isoprene are used in combination. In one embodiment the 1,3-diene is dimethyl butadiene. In case that the second monomer is a vinyl ester, in some embodiments the vinyl ester is vinyl acetate. In case that the second monomer is a vinyl ether, in some embodiments said vinyl ether is methyl-vinyl ether. In case that the second monomer is a (meth) acrylate, said (meth)acrylate is selected from the group consisting of methyl acrylate, methyl methacrylate and any combination thereof. Hence, in one embodiment the second monomer is methyl acrylate. In one embodiment the second monomer is methyl methacrylate. In another embodiment methyl acrylate and methyl methacrylate are used in combination.

As a hydrophobic monomer may be used as the second monomer, according to embodiments the non-ionic copolymer of any polyrotaxane described herein may be a hydrophobic copolymer. For the purposes of the present disclosure a "hydrophobic copolymer" may be defined as a copolymer comprising at least 60 mol % of structural units derived from a hydrophobic monomer, preferably at least 70 mol % of structural units derived from a hydrophobic monomer, more preferably at least 80 mol % of structural units derived from a hydrophobic monomer, even more preferably at least 90 mol % of structural units derived from a hydrophobic monomer, and most preferably at least 95 mol-% of structural units derived from a hydrophobic monomer, each based on 100 mol % of the total amount of structural units of the copolymer. In this context the term "hydrophobic monomer" is defined as above, namely as a monomer being insoluble in water or being sparingly soluble in water. Preferably, the hydrophobic monomer has a solubility in water at 20° C. of less than 20 g/l, more preferably of less than 10 g/l, still more preferably of less than 5 g/l and most preferably of less than 2 g/l. These definitions of a hydrophobic monomer may apply to both the first monomer having a stopper group and the second monomer. It is preferred that the copolymer of the polyrotaxanes described herein is a hydrophobic copolymer in case that a cyclodextrin and/or cyclodextrin derivative is used. Cyclodextrins and cyclodextrin derivatives have a hydrophobic cavity, and therefore threading of cyclodextrins and/or cyclodextrin derivatives on hydrophobic copolymers results only in minor interactions between the copolymer and the ring-shaped molecule. Due to such minor interactions the rotatability and movability along the copolymer chain of the ring-shaped moleculeare not significantly hindered.

In a preferred embodiment of any one of the polyrotaxanes disclosed herein the first monomer having a stopper group is poly(ethylene glycol) methyl ether methacrylate, the second monomer is isoprene and the ring-shaped molecule is selected from a cyclodextrin, a cyclodextrin derivative and any combination thereof. Preferably, in this embodiment the ring-shaped molecule is randomly methylated β-cyclodextrin (RAMEB). Furthermore, in this embodiment randomly methylated β-cyclodextrin (RAMEB) and 2-Hydroxy-3-N,N,N-trimethylamino)propyl-β-cyclodextrin chloride, a cationic ring-shaped molecule, may be used in combination. These combinations of monomers and ring-shaped molecules may be used in any polyrotaxane described herein wherein the copolymer is a random copolymer. It has been found that polyrotaxanes having this combination of monomers and ring-shaped molecules are soluble in water and soluble or dispersible in organic solvents, such as, for example, tetrahydrofuran, dimethylsulfoxide, or chloroform.

In another preferred embodiment of any one of the polyrotaxanes as described herein the first monomer having a stopper group is styrene, the second monomer is isoprene and the ring-shaped molecule is selected from a cyclodextrin, a cyclodextrin derivative and any combination thereof. Preferably, in this embodiment the ring-shaped molecule is randomly methylated β-cyclodextrin (RAMEB). This combination of monomers and ring-shaped molecules may be used in any polyrotaxane described herein wherein the copolymer is a random copolymer. It has been found that polyrotaxanes having this combination of monomers and ring-shaped molecules are soluble in organic solvents, such as, for example, tetrahydrofuran or chloroform.

In another preferred embodiment of any one of the polyrotaxanes disclosed herein the first monomer having a stopper group is myrcene, the second monomer is isoprene and the ring-shaped molecule is selected from a cyclodextrin, a cyclodextrin derivative and any combination thereof. Preferably, in this embodiment the ring-shaped molecule is randomly methylated β-cyclodextrin (RAMEB). This combination of monomers and ring-shaped molecules may be used in any polyrotaxane described herein wherein the copolymer is a random copolymer or a block copolymer. It has been found that polyrotaxanes having this combination of monomers and ring-shaped molecules are soluble in organic solvents, such as, for example, tetrahydrofuran or chloroform.

In another preferred embodiment of any one of the polyrotaxanes as described herein the first monomer having a stopper group is poly(ethylene glycol) monomethacrylate (PEGMA), the second monomer is isoprene and the ring-shaped molecule is selected from a cyclodextrin, a cyclodextrin derivative and any combination thereof. Preferably, in this embodiment the ring-shaped molecule is randomly methylated β-cyclodextrin (RAMEB). This combination of monomers and ring-shaped molecules may be used in any polyrotaxane described herein wherein the copolymer is a random copolymer. It has been found that polyrotaxanes having this combination of monomers and ring-shaped molecules are soluble in water and organic solvents, such as, for example, tetrahydrofuran, dimethylsulfoxide or chloroform.

In another preferred embodiment of any one of the polyrotaxanes as described herein the first monomer having a stopper group is styrene, the second monomer is methyl acrylate and the ring-shaped molecule is selected from a cyclodextrin, a cyclodextrin derivative and any combination thereof. Preferably, in this embodiment the ring-shaped molecule is randomly methylated β-cyclodextrin (RAMEB). This combination of monomers and ring-shaped molecules may be used in any polyrotaxane described herein wherein the copolymer is a random copolymer.

In another preferred embodiment of any one of the polyrotaxanes as described herein the first monomer having a stopper group is poly(ethylene glycol) methyl ether methacrylate, the second monomer is dimethyl butadiene and the ring-shaped molecule is selected from a cyclodextrin, a cyclodextrin derivative and any combination thereof. Preferably, in this embodiment the ring-shaped molecule is randomly methylated β-cyclodextrin (RAMEB). This combination of monomers and ring-shaped molecules may be used in any polyrotaxane described herein wherein the copolymer is a random copolymer.

In another preferred embodiment of any one of the polyrotaxanes as described herein the first monomer having a stopper group is hydroxyethyl methacrylate, the second monomer is isoprene and the ring-shaped molecule is selected from a cyclodextrin, a cyclodextrin derivative and any combination thereof. Preferably, in this embodiment the ring-shaped molecule is β-cyclodextrin. This combination of monomers and ring-shaped molecules may be used in any polyrotaxane described herein wherein the copolymer is a random copolymer.

In another preferred embodiment of any one of the polyrotaxanes as described herein the first monomer having a stopper group is poly(ethylene glycol) methyl ether methacrylate, the second monomer is isoprene and the ring-shaped molecule is a hydroxyproylated cyclodextrin. Preferably, in this embodiment the ring-shaped molecule is hydroxypropyl-β-cyclodextrin. This combination of monomers and ring-shaped molecules may be used in any polyrotaxane described herein wherein the copolymer is a random copolymer.

Any embodiment, feature, definition, or the like described herein with reference to any method of preparing a polyrotaxane also applies to any polyrotaxane described herein mutatis mutandis. In the same manner, any embodiment, feature, definition or the like described herein with reference to any polyrotaxane applies to any method of preparing a polyrotaxane described herein mutatis mutandis.

As advantage, the polyrotaxanes of the present invention are soluble or dispersible in water or organic solvents which are used in industry, such as tetrahydrofuran, dichloromethane, chloroform, ethyl acetate and acetone. Therefore, processing of the polyrotaxanes for various applications can be easily achieved.

In some embodiments the polyrotaxane is dispersed in water to form an aqueous dispersion. Accordingly, the present invention also relates to an aqueous dispersion comprising a polyrotaxane of the present invention dispersed in water. In an embodiment the particle size of the dispersed polyrotaxane is 5 µm or less.

In some embodiments the polyrotaxane is dissolved in water to form an aqueous solution. Accordingly, the present invention also relates to an aqueous solution comprising a polyrotaxane of the present invention dissolved in water.

The present invention also relates to a method of preparing a cross-linked polyrotaxane, said method comprising the steps of (a) providing a polyrotaxane of the present invention and (b) chemically or physically cross-linking said polyrotaxane.

In some embodiments of the method of preparing a cross-linked polyrotaxane said cross-linking comprises intermolecular cross-linking of polyrotaxanes by cross-linking of ring-shaped molecules using a cross-linking agent having at least two functional groups being capable of forming a bond to said ring-shaped molecules. In a particularly preferred embodiment such intermolecular cross-linking of polyrotaxanes comprises forming a covalent linkage between a first ring-shaped molecule threaded on a first copolymer chain and a second ring-shaped molecule threaded on another, second copolymer chain. In any one of the methods of preparing a cross-linked polyrotaxane described herein the cross-linking may be performed under heating. In preferred embodiments of the method of preparing a cross-linked polyrotaxane said ring-shaped molecule is a cyclodextrin or cyclodextrin derivative, and said cross-linking agent has at least two functional groups being capable of forming a bond with functional groups of said cyclodextrin or cyclodextrin derivative. In a preferred embodiment said functional groups of the cyclodextrin or cyclodextrin derivative reacting with the cross-linking agent are hydroxyl groups. In some embodiments the cross-linking agent is selected from the group consisting of a diisocyanate, a blocked diisocyanate, a diisothiocyanate, a bisepoxide, cyanuric chloride, divinylsulfone, and any combination thereof. A blocked diisocyanate can be described as a reaction product formed from a diisocyanate which is stable at room temperature but dissociates to regenerate the isocyanate functionalities under the influence of heat. In case that the cross-linking agent is a blocked diisocyanate, a blocked diisocyanate may be used which is described in D. A. Wicks, Z. W. Wicks Jr, Prog. Org. Coatings 1999, 36, 148-172. In case that the cross-linking agent is a bisepoxide, said bisepoxide may be bisphenol-A diglycidyl ether. However, the cross-linking agent is not particularly limited and other suitable cross-linking agents may be appropriately selected by a person skilled in the art. In embodiments the method of preparing a cross-linked polyrotaxane provides a gel. In particularly preferred embodiments the gel is a slide-ring gel.

The present invention also relates to a cross-linked polyrotaxane, wherein a polyrotaxane of the present invention is chemically or physically cross-linked.

In preferred embodiments the cross-linked polyrotaxane is obtainable or is obtained by any method of preparing a cross-linked polyrotaxane described herein in accordance with the present invention.

In some embodiments of the cross-linked polyrotaxane the polyrotaxanes are cross-linked intermolecularly via ring-shaped molecules and a cross-linking agent. In a particularly preferred embodiment such intermolecular cross-linking of polyrotaxanes is provided by a covalent linkage between a first ring-shaped molecule threaded on a first copolymer chain and a second ring-shaped molecule threaded on another, second copolymer chain. In some the ring-shaped molecule is a cyclodextrin or cyclodextrin derivative, and said cross-linking agent is bonded to functional groups of said cyclodextrin or cyclodextrin derivative. In a preferred embodiment, the functional groups of the cyclodextrin or cyclodextrin derivative reacting with the cross-linking agent are hydroxyl groups. In some embodiments the cross-linking agent is selected from the group consisting of a diisocyanate, a blocked diisocyanate, a diisothiocyanate, a bisepoxide, cyanuric chloride, divinylsulfone, and any combination thereof. In case that the cross-linking agent is a blocked diisocyanate, a blocked diisocyanate may be used which is described in D. A. Wicks, Z. W. Wicks Jr, Prog. Org. Coatings 1999, 36, 148-172. In case that the cross-linking agent is a bisepoxide, said bisepoxide may be bisphenol-A diglycidyl ether. However, the cross-linking agent is not particularly limited and other suitable cross-linking agents may be appropriately selected by a person skilled in the art.

In some embodiments the cross-linked polyrotaxane is a gel. With this regard, the cross-linked polyrotaxane may form a physical gel or a chemical gel. As known to a person skilled in the art a physical gel has non-covalent cross-linking junctions which may arise due to physical attraction action between polymers, such as, for example, ionic interaction, hydrophobic interaction, hydrogen bonding, microcrystal formation, helix formation and the like. On the other hand, in a chemical gel cross-linking is provided through covalent bonding.

In particularly preferred embodiments the cross-linked polyrotaxane is a slide-ring gel. A slide-ring gel is different from physical and chemical gels as in a slide-ring gel polymer chains are topologically interlocked. In a slide-ring gel nearly only the ring-shaped molecules are cross-linked while the copolymer chains are not cross-linked or cross-linked to a small extent only. More specifically, as can be seen from FIG. 2, which schematically depicts formation of a slide-ring gel and a slide-ring gel in accordance with embodiments of the present invention, a slide-ring gel exhibits an architecture, wherein a first ring-shaped molecule threaded on a first copolymer chain is covalently linked to a second ring-shaped molecule threaded on another, second copolymer chain. By such cross-linking two ring-shaped molecules covalently linked with each other exhibit a shape similar to the figure eight. Since only the ring-shaped molecules are cross-linked, the cross-links are freely movable along the copolymer chains and can therefore move freely in the polymer network. As a consequence, tension of the copolymer chains which thread the ring-shaped molecules is equalized in a manner similar to pulleys. This effect disperses the tension in the copolymer chains automatically on tensile deformation, and therefore it is difficult to cause crack or flaw. The concept of a slide-ring gel is described, for example, in K. Ito, Polym. J. (Tokyo, Jpn.) 2007, 39, 489-499.

Any embodiment, feature, definition, or the like described herein with reference to any method of preparing a cross-linked polyrotaxane also applies to any cross-linked polyrotaxane described herein mutatis mutandis. In the same manner, any embodiment, feature, definition or the like described herein with reference to any cross-linked polyrotaxane applies to any method of preparing a cross-linked polyrotaxane described herein mutatis mutandis.

The polyrotaxanes and cross-linked polyrotaxanes disclosed herein may be used as self-healing materials, for encapsulation, for drug delivery, for the preparation of solutions, dispersions or composite materials, as adhesives, and as surface coatings.

Accordingly, also encompassed by the present invention is the use of a polyrotaxane as disclosed herein as a self-healing material. In addition, the present invention also relates to the use of a cross-linked polyrotaxane as disclosed herein as a self-healing material. Accordingly, the present invention also relates to a method of providing a surface having a self-healing surface coating, the method comprising the steps of (a) providing a surface and (b) coating onto the surface a polyrotaxane and/or a cross-linked polyrotaxane disclosed herein to provide a surface having a self-healing surface coating. It is particularly preferred that for applications as a self-healing material the polyrotaxane is a slide-ring gel. The surface is not particularly limited, and, for example, the surface may be a metal surface, a glass surface, a ceramic surface, a wood surface, or the like. With this regard, the term "self-healing" refers to the ability of a material to repair damage caused by mechanical impact without human intervention. Self-healing properties are, for example, useful in paints and adhesives. Such paints and adhesives may, for example, be used for automotive vehicles which require a car-washing resistance, a chipping resistance, an impact resistance and weather resistance, but also for paint, resin base material and the like for home-electric appliances.

The present invention further relates to the use of a polyrotaxane as disclosed herein for encapsulation. Also the present invention relates to the use of a cross-linked polyrotaxane as disclosed herein for encapsulation. Accordingly, the present invention also relates to a method of encapsulating a material with a polyrotaxane, the method comprising the steps of (a) providing a material to be encapsulated and (b) encapsulating the material using a polyrotaxane and/or a cross-linked polyrotaxane disclosed herein to provide an encapsulated material. In embodiments said polyrotaxane or cross-linked polyrotaxane is used for encapsulation of a pharmaceutically active agent. This means that the material to be encapsulated is a pharmaceutically active agent. The pharmaceutically active agent to be encapsulated by the polyrotaxane or the cross-linked polyrotaxane is not particularly limited. For example, in embodiments the pharmaceutically active agent is selected from the group consisting of a hydrophobic drug, a steroidal drug, an anticancer drug, and any combination thereof.

Further, the present invention relates to the use of a polyrotaxane as described herein as a carrier for a pharmaceutically active agent. Similarly, the present invention also relates to the use of a cross-linked polyrotaxane as described herein as a carrier for a pharmaceutically active agent. The pharmaceutically active agent to be encapsulated by the polyrotaxane or the cross-linked polyrotaxane is not particularly limited. For example, in embodiments the pharmaceutically active agent is selected from the group consisting of a hydrophobic drug, a steroidal drug, an anticancer drug, and any combination thereof.

The present invention also relates to a method of coating of a surface with a polyrotaxane, the method comprising coating a solution or a dispersion containing a polyrotaxane as described herein onto the surface. In some embodiments the coating is performed using dipping, spin coating, spraying, and/or spray coating. Preferably, the coating is performed using a dispersion or a solution of the polyrotaxane in water or an organic solvent. The surface to be coated is not particularly limited. For example, the surface to be coated may be a metal surface, a glass surface, a ceramic surface, a wood surface, or the like. Such method can be used, for example, for applying a self-healing coating of a polyrotaxane on a surface. Coatings comprising polyrotaxanes described herein are, for example, useful as corrosion inhibitor, for controlling adhesion and friction and for providing scratch resistance.

Also encompassed by the present invention is the use of a cross-linked polyrotaxane as described herein as an adhesive. Preferably, in case that the cross-linked polyrotaxane is used as an adhesive, the cross-linked polyrotaxane is a gel.

The present invention further relates to a dispersion comprising metal particles and/or metal oxide particles and a polyrotaxane as herein described. In some embodiments the metal particles and/or metal oxide particles are nanoparticles.

Also the present invention relates to a composite composed of metal and/or metal oxide particles and a polyrotaxane as herein described. In some embodiments the metal and/or metal oxide particles are nanoparticles.

It must be noted that as used herein, the singular forms "a", "an", and "the", include plural references unless the context clearly indicates otherwise. Thus, for example, reference to "a reagent" includes one or more of such different reagents and reference to "the method" includes reference to equivalent steps and methods known to those of ordinary skill in the art that could be modified or substituted for the methods described herein.

All publications and patents cited in this disclosure are incorporated by reference in their entirety. To the extent the material incorporated by reference contradicts or is inconsistent with this specification, the specification will supersede any such material.

Unless otherwise indicated, the term "at least" preceding a series of elements is to be understood to refer to every element in the series. Those skilled in the art will recognize, or be able to ascertain using no more than routine experimentation, many equivalents to the specific embodiments of the invention described herein. Such equivalents are intended to be encompassed by the present invention.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integer or step. When used herein the term "comprising" can be substituted with the term "containing" or sometimes when used herein with the term "having".

When used herein "consisting of" excludes any element, step, or ingredient not specified in the claim element. When used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms.

Several documents are cited throughout the text of this specification. Each of the documents cited herein (including all patents, patent applications, scientific publications, manufacturer's specifications, instructions, etc.), whether supra or infra, are hereby incorporated by reference in their entirety. Nothing herein is to be construed as an admission that the invention is not entitled to antedate such disclosure by virtue of prior invention.

EXAMPLES

The following examples further illustrate the invention. These examples should however not be construed as to limit the scope of this invention. The examples are included for purposes of illustration and the present invention is limited only by the claims.

Example 1

Polyrotaxane Prepared Via Free Radical Polymerization: poly(isoprene-co-PEG methyl ether methacrylate)-Randomly methylated β-cyclodextrin polyrotaxane

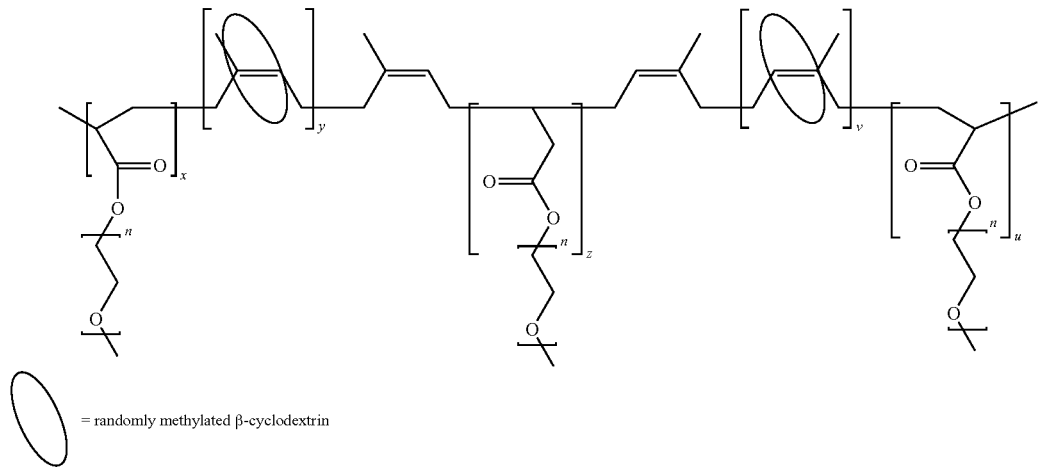

= randomly methylated β-cyclodextrin 6.50 mg (0.03 mmol) ammonium persulfate (radical initiator), 5.90 g (4.50 mmol) randomly methylated β-cyclodextrin (RAMEB, ring-shaped molecule) and 0.22 g (0.45 mmol) poly(ethylene glycol) methyl ether methacrylate (first monomer having a stopper group) were dissolved in 10 mL deionized water and the system was bubbled through with nitrogen gas for 30 min under stirring. After addition of 0.45 mL (0.31 g, 4.50 mmol) freshly distilled isoprene (second monomer, hydrophobic) the nitrogen flow was stopped and the system was stirred to give homogenous solution, i.e. RAMEB/isoprene complex formation. The reaction was started by addition of a catalytic amount (<0.1 mL) of N,N,N',N'-tetramethylethylenediamine (TMEDA) and stirred at room temperature for some hours. After reaction, the clear aqueous solution was purified by ultrafiltration (10000 molecular weight cut-off polyethersulfone membrane). The product (500 mg) was obtained as a white powder after freeze drying.

TLC: $R_f$ (EtOAc/MeOH 7/3 v/v)=0, no traces of free RAMEB $^1$H-NMR (CDCl$_3$, 400 MHz) δ/ppm=5.15-4.95 (methine groups), 2.05-1.85 (methylene groups) and 1.75-1.45 ppm (methyl groups) for polyisoprene, 5.00 (s, 1H, H-1), 3.65 (s, 3H, H-7), 3.40 (s, 3H, H-8), 3.95-3.25 (m, 5H, H-2, H-3, H-4, H-5, H-6) ppm for RAMEB Polarimetry: c=3.40 mg/mL α=0.036 deg ITC: 7.5 wt % free RAMEB An isothermal titration calorimetry (ITC) study of the polyrotaxane prepared in Example 1 shows that the sample contains only 6.4% of free randomly methylated β-cyclodextrin (RAMEB) which is not threaded on the isoprene styrene copolymer.

Example 2

Polyrotaxane Prepared Via Free Radical Polymerization: poly(isoprene-co-styrene)-Randomly methylated β-cyclodextrin polyrotaxane

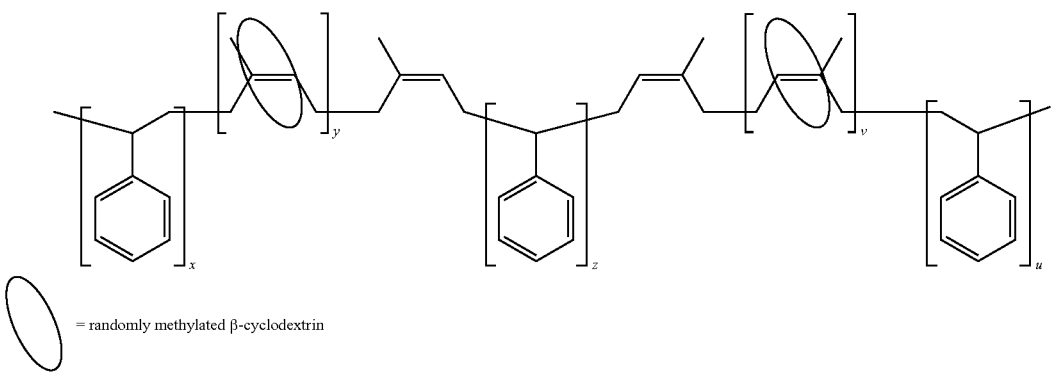

= randomly methylated β-cyclodextrin 6.50 mg (0.03 mmol) ammonium persulfate (radical initiator), 5.90 g (4.50 mmol) randomly methylated β-cyclodextrin (RAMEB, ring shaped molecule) and 0.046 mL (0.45 mmol) styrene (first monomer having a stopper group) were dissolved in 10 mL deionized water and the system was bubbled through with nitrogen gas for 30 min under stirring. After addition of 0.45 mL (0.31 g, 4.50 mmol) freshly distilled isoprene (second monomer, hydrophobic) the nitrogen flow was stopped and the system was stirred to give a homogenous solution, i.e. RAMEB/isoprene complex formation. The reaction was started by addition of a catalytic amount (<0.1 mL) of N,N,N',N'-tetramethylethylenediamine (TMEDA) and stirred at room temperature for some hours. After reaction, the product was filtered off and freeze dried overnight. The product (300 mg) was obtained as white foam.

TLC: $R_f$ (EtOAc/MeOH 7/3 v/v)=0, no traces of free RAMEB $^1$H-NMR (CDCl$_3$, 400 MHz) δ/ppm=5.15-4.95 (methine groups), 2.05-1.85 (methylene groups) and 1.75-1.45 ppm (methyl groups) for polyisoprene, 5.00 (s, 1H, H-1), 3.65 (s, 3H, H-7), 3.40 (s, 3H, H-8), 3.95-3.25 (m, 5H, H-2, H-3, H-4, H-5, H-6) ppm for RAMEB and 7.10-7.50 ppm for aromatic protons of styrene.

Polarimetry: c=0.98 mg/mL α=0.007 deg
ITC: 6.4 wt % free RAM EB

Small amount (20-50 mg) polyrotaxane was reacted with HClO$_4$ (1 mM, 25 mL) at 70° C. for 20 hours. After neutralization of the acid with NaOH, the resulting insoluble polymer was removed from the aqueous phase by filtration, and was washed with water several times and dried in vaccum.

FIG. 3 shows $^1$H NMR spectra of a) the polyrotaxane prepared in Example 2 and b) of the free isoprene styrene copolymer without having threaded the randomly methylated β-cyclodextrin (RAMEB) obtained by hydrolysis of the polyrotaxane prepared as described above. The signal broadening in a) is indicative for the polyrotaxane structure in which the randomly methylated β-cyclodextrin is threaded on the isoprene styrene copolymer.

FIG. 4 shows a ROESY NMR spectrum of the polyrotaxane prepared in Example 2 in CDCl$_3$. The cross-peak highlighted shows a correlation between the olefinic protons of the isoprene styrene copolymer and the protons of the randomly methylated β-cyclodextrin (RAMEB) indicating that the RAMEB is threaded on the copolymer.

Example 3

Statistical Copolymeric Polyrotaxane Prepared Via Reversible Addition Fragmentation Chain Transfer Radical Copolymerization (RAFT): poly(isoprene-co-myrcene)-Randomly Methylated β-cyclodextrin Polyrotaxane 0.92 mg (0.003 mmol) 2,2'-azobis[2-(2-imidazolin-2-yl)propane] dihydrochloride (initiator VA-044 of Wako Pure Chemical Industries, Ltd.), 8.06 mg (0.03 mmol) S,S'-Bis (α,α'-dimethyl-α"-acetic acid)-trithiocarbonate (chain transfer agent), 5.90 g (4.50 mmol) randomly methylated β-cyclodextrin (RAMEB, ring-shaped molecule) and 0.08 mL (61 mg, 0.45 mmol) myrcene (first monomer having a stopper group) were dissolved in 10 mL deionized water and the system was bubbled through with nitrogen gas for 30 min under stirring. After addition of 0.45 mL (0.31 g, 4.50 mmol) freshly distilled isoprene (second monomer, hydrophobic) the nitrogen flow was stopped and the system was stirred to give a homogenous solution, i.e. RAM EB/isoprene complex formation. The reaction was placed in a 35° C. oil bath in order to start the reaction and was stirred for 3 days. In particular, the reaction vessel was heated to 35° C. in order to start the reaction and stirring was performed for 3 days. After reaction, the product was filtered off and dried at 45° C. in vacuo overnight. The product (250 mg) was obtained as yellowish/transparent oil like film.

TLC: $R_f$ (EtOAc/MeOH 7/3 v/v)=0, no traces of free RAMEB $^1$H-NMR (CDCl$_3$, 400 MHz) δ/ppm=5.15-4.95 (methine groups), 2.05-1.85 (methylene groups) and 1.75-1.45 ppm (methyl groups) for polyisoprene, 5.00 (s, 1H, H-1), 3.65 (s, 3H, H-7), 3.40 (s, 3H, H-8), 3.95-3.25 (m, 5H, H-2, H-3, H-4, H-5, H-6) ppm for RAMEB Polarimetry: c=10.75 mg/mL α=0.024 deg ITC: 2.2 wt % free RAMEB Example 4

Block-Copolymeric Polyrotaxane Prepared Via Reversible Addition Fragmentation Chain Transfer Radical Copolymerization (RAFT): poly(myrcene-b-isoprene-b-myrcene)-Randomly Methylated β-cyclodextrin Polyrotaxane

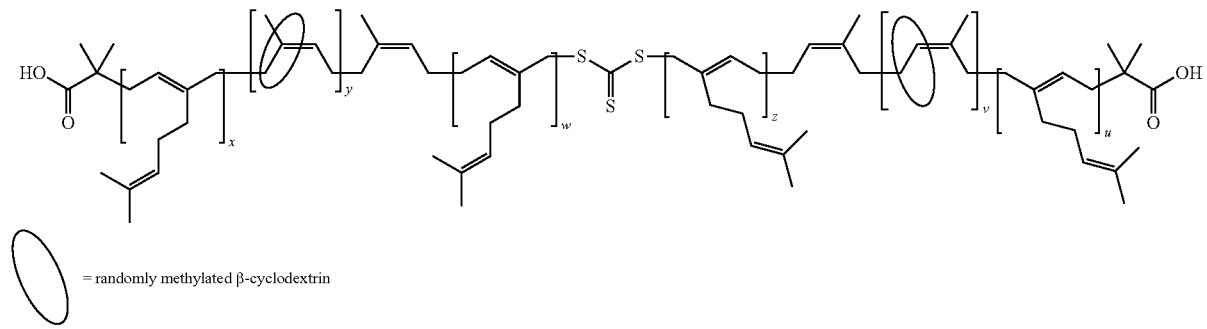

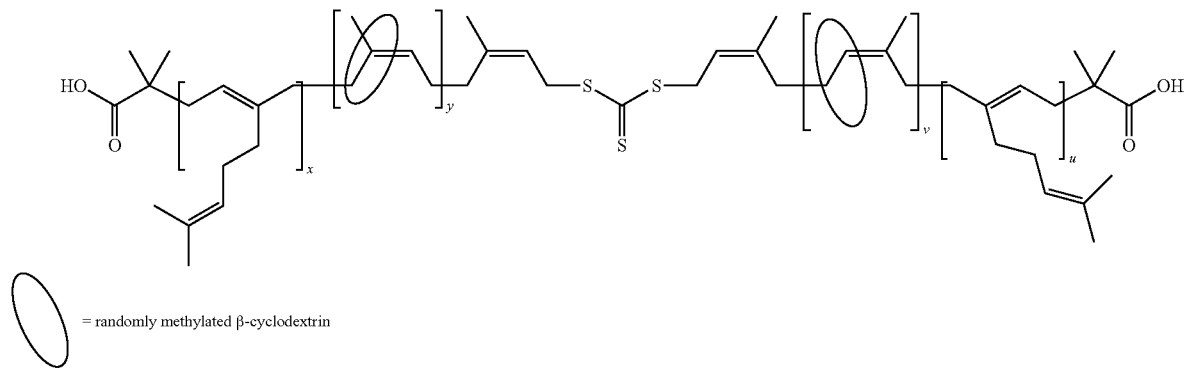

= randomly methylated β-cyclodextrin 0.92 mg (0.003 mmol) 2,2'-azobis[2-(2-imidazolin-2-yl)propane]dihydrochloride (initiator VA-044 of Wako Pure Chemical Industries, Ltd.), 8.06 mg (0.03 mmol) S,S'-Bis (α,α'-dimethyl-α''-acetic acid)-trithiocarbonate (bifunctional Chain transfer agent), 0.59 g (0.45 mmol) randomly methylated β-cyclodextrin (RAMEB, ring-shaped molecule) and 0.08 mL (61 mg, 0.45 mmol) myrcene (first monomer having a stopper group) were dissolved in 1 mL deionized water and the system was bubbled through with nitrogen gas for 30 min under stirring. The reaction was placed in a 35° C. oil bath in order to start the reaction. In particular, the reaction vessel was heated to 35° C. in order to start the reaction and the reaction mixture was stirred. After 1 day reaction time 0.45 mL (0.31 g, 4.50 mmol) freshly distilled isoprene (second monomer, hydrophobic) complexed by 5.90 g (4.50 mmol) RAMEB in 10 mL of water was added to the mixture and reacted for additional 3 days. After reaction, the cloudy aqueous dispersion was heated above 80° C. The product precipitated on this temperature, was filtered off and washed with hot water several times. The product (350 mg) was obtained as yellowish/transparent oil like film after drying at 45° C. in vacuo overnight.

TLC: $R_f$ (EtOAc/MeOH 7/3 v/v)=0, no traces of free RAMEB $^1$H-NMR (CDCl$_3$, 400 MHz) δ/ppm=5.15-4.95 (methine groups), 2.05-1.85 (methylene groups) and 1.75-1.45 ppm (methyl groups) for polyisoprene, 5.00 (s, 1H, H-1), 3.65 (s, 3H, H-7), 3.40 (s, 3H, H-8), 3.95-3.25 (m, 5H, H-2, H-3, H-4, H-5, H-6) ppm for RAMEB Polarimetry: c=2.00 mg/mL α=0.006 deg ITC: <1 wt % free RAMEB Example 5

Statistical Copolymeric Polyrotaxane Prepared Via Atom Transfer Radical Polymerization (ATRP): poly(isoprene-co-PEGMA)-Randomly Methylated β-Cyclodextrin Polyrotaxane

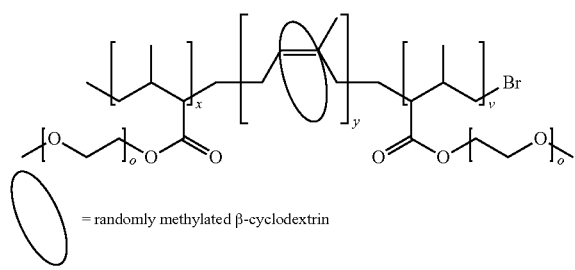

= randomly methylated β-cyclodextrin 5.89 g (4.45 mmol) randomly methylated β-cyclodextrin (RAMEB, ring-shaped molecule), 406 µl (4.06 mmol) isoprene (second monomer, hydrophobic), 208 µl (0.45 mmol) poly(ethylene glycol) monomethacrylate (PEGMA, first monomer having a stopper group) and 8.24 µl (0.06 mmol) 2-hydroxyethyl 2-bromoisobutyrate (HEBIB, initiator for ATRP) were dissolved in 8 ml deionized water. 35 mg (2.19 µmol) haemoglobin (redox enzyme, catalyst for ATRP) was dissolved in 3 ml deionized water and 15 mg (85.17 µmol) ascorbic acid (reducing agent for regeneration of the catalyst) was dissolved in 2 ml deionized water. The three systems were bubbled through with nitrogen gas for 3 hours under stirring. The polymerization was started by transferring 2 ml of ascorbic acid solution and 3 ml of native haemoglobin solution to the monomer flask and stirred at room temperature for two days. After reaction the solution was ultrafiltrated with a 10 kDa cellulose-membrane and lyophilised. A brownish powder (285 mg) was obtained.

TLC: $R_f$ (EtOAc/MeOH 7/3 v/v)=0.06

$^1$H-NMR (CDCl$_3$, 400 MHz) δ/ppm=5.15-4.95 (methine groups), 2.05-1.85 (methylene groups) and 1.75-1.45 ppm (methyl groups) for polyisoprene, 5.00 (s, 1H, H-1), 3.65 (s, 3H, H-7), 3.40 (s, 3H, H-8), 3.95-3.25 (m, 5H, H-2, H-3, H-4, H-5, H-6) ppm for RAMEB Polarimetry: c=10.30 mg/mL α=0.090 deg ITC: 2.2 wt % free RAMEB FIG. 5 shows a DOSY NMR spectrum of the polyrotaxane prepared in Example 5 in CDCl$_3$ indicating that the randomly methylated β-cyclodextrin (RAMEB) is threaded on the isoprene PEGMA copolymer. The regular $^1$H-spectrum of the sample is depicted with the assignments on top of the DOSY spectrum showing the RAMEB signals (3.95-3.25 and 5.00 ppm), polyisoprene signals (1.6, 2.0 and 5.1 ppm) and the PEGMA signal (3.65 ppm). The corresponding cross peaks are all situated at a rather low diffusion coefficient D with log D=-9.7 (equivalent to D=2×10$^{-10}$ m$^2$/s) indicating that all constituents are part of the same molecular entity, namely the polyrotaxane. In contrast, free RAMEB would have significantly higher diffusion coefficients around log D=-9.1 (equivalent to D=8×10$^{-10}$ m$^2$/s).

FIG. 6 provides an isothermal titration calorimetry (ITC) measurement (using Nano ITC from TA Instruments) at 25° C. of the said polyrotaxane showing that nearly no free randomly methylated β-cyclodextrin (RAMEB) is present in the sample. The total weight fraction $w_{oT}$ of RAMEB of the said polyrotaxane was determined from the optical rotation of a solution (10 mg/ml) in CHCl$_3$ at α=589 nm obtained from a Perkin Elmer Model 241 polarimeter applying the specific rotation of RAMEB [α]=+130. A solution of the said polyrotaxane in 0.1 M phosphate buffer (total concentration of RAMEB 1.0 mM) was titrated with a 8 mM solution of the guest adamantane-1-carboxylate sodium salt monitored by ITC. The evolved heats were corrected by the corresponding heats of dilution and fitted by the program NanoAnalyze from TA Instruments using the algorithm for interactions with 1:1 stoichiometry. The found stoichiometry number n=0.021 means that 2.1 mol % of RAMEB was free. In other words 97.9 mol % of RAMEB was not available for the guest because threaded on the polyisoprene chain. The weight $w_0$ fraction of threaded RAMEB was calculated according to $w_0=w_{oT}(1-n)$. The weight fraction of threaded polymer equal to the sum of the weight fractions of monomer 1 and monomer 2, $w_1+w_2=1-w_0$. The ratio of $w_1$ and $w_2$ was determined from the ratio of the integrals of the respective $^1$H NMR signals each normalized upon the respective number of protons. The respective molar fractions $x_i$ of RAMEB, monomer units 1 and 2, are calculated according to $$x_0 = \frac{w_0}{M_0} \bigg/ \left(\frac{w_0}{M_0} + \frac{w_1}{M_1} + \frac{w_2}{M_2}\right),$$

$$x_1 = \frac{w_1}{M_1} \bigg/ \left(\frac{w_0}{M_0} + \frac{w_1}{M_1} + \frac{w_2}{M_2}\right), \text{ and}$$

$$x_2 = \frac{w_2}{M_2} \bigg/ \left(\frac{w_0}{M_0} + \frac{w_1}{M_1} + \frac{w_2}{M_2}\right)$$

using the respective molecular weights of RAMEB, monomer units 1 and 2, $M_0$, $M_1$ and $M_2$.

Example 6

Statistical Copolymeric Polyrotaxane Prepared Via Free Radical Polymerization: poly(isoprene-co-PEG methyl ether methacrylate)-Randomly Methylated β-cyclodextrin and (2-Hydroxy-3-N,N,N-trimethylamino)propyl-β-cyclodextrin Chloride Polyrotaxane 6.50 mg (0.03 mmol) ammonium persulfate (radical initiator), 5.37 g (4.09 mmol) randomly methylated β-cyclodextrin (RAMEB, ring-shaped molecule), 0.63 g (0.41 mmol) (2-Hydroxy-3-N,N,N-trimethylamino)propyl-β-cyclodextrin chloride (cationic, ring-shaped molecule) and 0.22 g (0.45 mmol) poly(ethylene glycol) methyl ether methacrylate (first monomer having a stopper group) were dissolved in 10 mL deionized water and the system was bubbled through with nitrogen gas for 30 min under stirring. After addition of 1.80 mL (1.23 g, 18 mmol) freshly distilled isoprene (second monomer, hydrophobic) the nitrogen flow was stopped and the system was stirred to give a homogenous solution, i.e. RAMEB/isoprene complex formation. The reaction was started by addition of a catalytic amount (<0.1 mL) of N,N,N',N'-tetramethylethylenediamine (TMEDA) and stirred at room temperature for some hours. After reaction, the clear aqueous solution was purified by ultrafiltration (10000 molecular weight cut-off cellulose membrane). The product (300 mg) was obtained as a white powder after freeze drying.

TLC: $R_f$ (EtOAc/MeOH 7/3 v/v)=0, no traces of free RAMEB $^1$H-NMR (DMSO d$_6$, 400 MHz) δ/ppm=5.15-4.95 (methine groups), 2.05-1.85 (methylene groups) and 1.75-1.45 (methyl groups) for polyisoprene; 5.77 (s, 0.1H cationic group), 5.00 (s, 1H, H-1), 4.80 (s, 1H, H-7), 4.50 (s, 1H-cationic group), 4.09 (s, 1H, cationic group), 3.50 (s, PEG), 3.40 (s, 3H, H-8), 3.95-3.25 (m, 5H, H-2, H-3, H-4, H-5, H-6), 3.00 (0.4H, cationic group) ppm for RAMEB and (2-Hydroxy-3-N,N,N-trimethylamino)propyl-β-cyclodextrin chloride Polarimetry: c=4.90 mg/mL α=0.052 deg (in DMSO)

ITC: 2.9 wt % free RAMEB

Example 7

Cyclodextrin Content of the Polyrotaxanes Obtained in Examples 1 to 5

The cyclodextrin content $w_0$ and the molar ratio of isoprene repeating units over RAMEB units $x_2/x_0$ of the polyrotaxanes obtained in Examples 1 to 6 was calculated according to the procedure set out in the description of FIG. 6 under Example 5 and listed in the following Table 1.

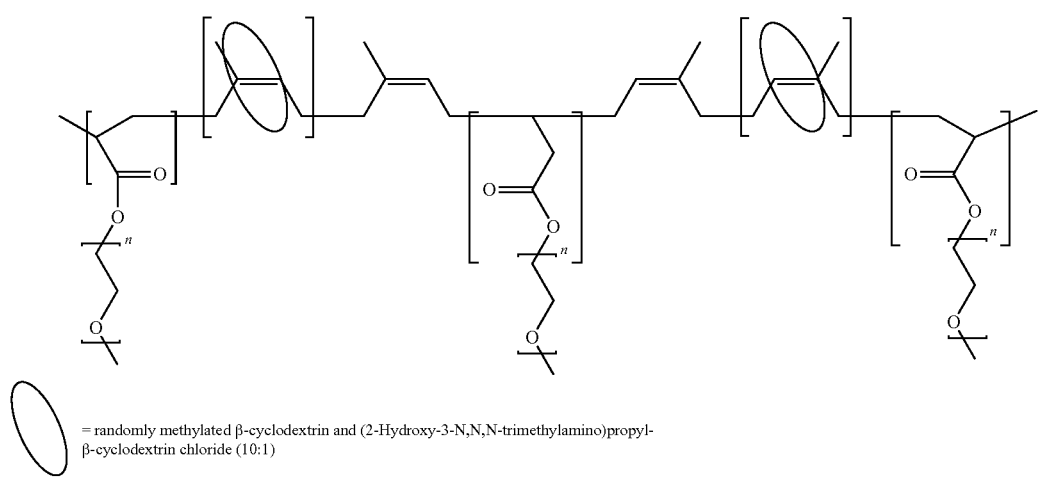

= randomly methylated β-cyclodextrin and (2-Hydroxy-3-N,N,N-trimethylamino)propyl-β-cyclodextrin chloride (10:1)

TABLE 1

| | Polymerization method | Threaded cyclodextrin [wt. %] $w_0$ | Molar ratio of isoprene repeating units to cyclodextrin units $x_2/x_0$ |
|---|---|---|---|
| Example 1 | Free radical | 68 | 5 |
| Example 2 (Run 1) | Free radical | 50 | 18 |
| Example 3 | RAFT statistical | 14 | 117 |
| Example 4 | RAFT block | 22 | 71 |
| Example 5 | ATRP | 61 | 12 |
| Example 6 | Free radical | 47 | 3 |

The values of Table 1 show that a high content of threaded cyclodextrin and a low ratio of isoprene repeating units to cyclodextrin units is obtained in case that the copolymerization is performed as free radical polymerization or atom transfer radical polymerization (ATRP). On the other hand, a comparably low content of threaded cyclodextrin and a comparably high ratio of isoprene units to cyclodextrin units is obtained when reversible addition fragmentation chain transfer radical polymerization (RAFT polymerization) is employed.

Example 8

Test for Micelle Formation (Nile Red Fluorescence Test)

In order to evaluate the suitability of the polyrotaxanes prepared in Examples 1 to 6 for micelle formation and encapsulation, experiments were performed in which the dye nile red was encapsulated by the polyrotaxanes.

Nile red (IUPAC name: 9-diethylamino-5-benzo[α]phenoxazinone) is widely used to determine the formation of micelles or the solubilisation of hydrophobic materials in an aqueous solution. This test takes account of the fact that the ultraviolet-visible spectra of nile red strongly depend of the philicity of the environment of this dye. In other words, the absorption of ultraviolet and/or visible light of nitrile red is influenced by the environment of the dye, and nile red molecules entrapped in the apolar inner part of a micelle or capsule show an absorption of UV/Vis radiation which significantly differs from the absorption of free nile red molecules in an aqueous solution.

The test was performed using different concentrations of 10 µM, 20 µM, 30 µM, 40 µM and 50 µM nile red while the concentration of the polyrotaxane was kept constant. The polyrotaxane and the nile red were each dissolved separately in absolute tetrahydrofuran and then poured into water. Alternatively, in case that the polyrotaxanes have a high cyclodextrin content the polyrotaxane may be dissolved in water directly. The obtained aqueous solutions were stirred at room temperature for three days in order to remove the tetrahydrofuran, and the solution was refilled with water.

The aqueous solutions prepared according to this protocol were investigated using UV/Vis spectroscopy. The samples prepared from a polyrotaxane and nile red showed a broad absorption band at 527 nm, which is attributed to nile red in an apolar environment. This result shows that nile red molecules are entrapped in the apolar inner part of polyrotaxane substructures, i.e. the nile red is encapsulated by the polyrotaxane. In contrast, no absorption around 527 nm was observed in a comparative nile red solution which did not contain a polyrotaxane. FIG. 7 shows UV/Vis spectra of the dye nile red (50 µM) a) in presence and b) in absence of the polyrotaxane prepared in Example 5. Furthermore, the formation of micellar aggregates from the prepared polyrotaxanes has been verified using electron microscopy. FIG. 8 shows an electron micrograph of spherical micellar aggregates formed in aqueous solution from the polyrotaxane prepared in Example 1.

The results of the nile red test and the electron micrograph further corroborate that the polyrotaxanes are suitable for micelle formation and encapsulation of a substance.

Example 9

Solubilization of a Drug 10 mg of polyrotaxane from Example 6 was dissolved in 10 mL of saline HEPES buffer (pH=7.2, NaCl concentration 0.9 wt. %). 24.4 mg Docetaxel (trade name: Taxotere) was dissolved in 5 ml THF. Various amounts (20-200 µl) of the docetaxel solution were added to 1 ml of the polyrotaxane solution and stirred for 16 h. The THF was allowed to evaporate. The residual mixture was passed to a 0.45 µm Teflon filter to obtain a clear filtrate. From the UV extinction at 229 nm of the filtrate the concentration of dissolved docetaxel was determined taken into account the extinction coefficient 16240 Lmol$^{-1}$ cm$^{-1}$ of docetaxel measured in ethanol. The concentration of uptaken solubilized docetaxel is shown in the graph in FIG. 9.

Example 10

Formation of a Slide-Ring Gel 10 mg of polystyrene-polyisoprene random copolymer polyrotaxane prepared in Example 2 and 1.5 µL (0.009 mmol) hexamethylene diisocyanate cross-linking agent were dissolved in 0.1 mL dichloromethane and transferred into a glass vial. The vial was shaken at room temperature for 10 minutes and transferred into a metal mold, closed and heated to 80° C. The formed slide-ring gel was washed with dichloromethane for two days and then with water for another one day to remove the non-reacted polyrotaxane and cross-linker. After the extraction the gels were dried and the mass of the cross-linked white network was measured.

Yield: 85

Formation of a slide-ring gel is schematically depicted in FIG. 2.

Example 11

Polyrotaxane Prepared Via Free Radical Polymerization: poly(methyl acrylate-co-styrene)-Randomly methylated β-cyclodextrin polyrotaxane 9.20 mg (0.03 mmol) 2,2'-azobis[2-(2-imidazolin-2-yl) propane] dihydrochloride (radical initiator VA-044), 4.50 g (3.50 mmol) randomly methylated β-cyclodextrin (RAMEB) and 0.046 mL (0.45 mmol) styrene (first monomer) were dissolved in 5 mL deionized water and a stream of nitrogen gas was bubbled through for 30 min under stirring. After addition of 0.41 mL (0.39 g, 4.50 mmol) freshly distilled methyl acrylate (second monomer) the nitrogen flow was stopped and the system was stirred to allow homogenous dissolution. The reaction vessel was heated to 35° C. in order to start the reaction and was stirred for 3 days. Afterwards, the product was filtered off and dried at 45° C. in vacuo overnight. The product (310 mg) was obtained as a white precipitate with 5.9 wt. % threaded and 4.7 wt. % free RAMEB.

$^1$H-NMR (CDCl$_3$, 400 MHz) δ/ppm=3.50 (methoxy), 2.40-1.85 (methyl) and 1.80-1.10 ppm (methine) for poly (methyl acrylate), 5.00 (H-1), 3.65 (H-7), 3.40 (H-8), 3.95-3.25 (H-2, H-3, H-4, H-5, H-6) ppm for RAMEB Polarimetry (DMSO): c=11.70 mg/mL, d=0.1 dm, α=+0.016 deg ITC: ~4.7 wt % free RAMEB FIG. 10 shows a ¹H NMR spectrum of the polyrotaxane prepared in Example 11

Example 12

Polyrotaxane Prepared Via Free Radical Polymerization: poly(dimethylbutadiene-co-PEG methyl ether methacrylate)-Randomly methylated β-cyclodextrin polyrotaxane 9.20 mg (0.03 mmol) 2,2'-azobis[2-(2-imidazolin-2-yl)propane] dihydrochloride (radical initiator VA-044), 5.90 g (4.50 mmol) randomly methylated β-cyclodextrin (RAMEB) and 0.21 g (0.45 mmol) poly(ethylene glycol) methyl ether methacrylate (first monomer) were dissolved in 10 mL deionized water and and a stream of nitrogen gas was bubbled through for 30 min under stirring. After addition of 0.51 mL (0.37 g, 4.50 mmol) freshly distilled dimethyl butadiene (second monomer) the nitrogen flow was stopped and the system was stirred to to allow homogenous dissolution. The reaction vessel was heated to 35° C. in order to start the reaction and was stirred for 3 days. Afterwards, the product was filtered off at 80° C., washed with water and dried at 45° C. in vacuo overnight. The product (570 mg) was obtained as a white precipitate with 50 wt. % of threaded and no free RAMEB.

TLC: $R_f$ (EtOAc/MeOH 7/3 v/v)=0, no traces of free RAMEB

¹H-NMR (DMSO-d6, 400 MHz) δ/ppm=2.10-1.35 (methylene) and 1.20-0.80 ppm (methyl) for poly(dimethyl butadiene), 5.00 (H-1), 3.65 (H-7), 3.40 (H-8), 3.95-3.25 (H-2, H-3, H-4, H-5, H-6) ppm for RAMEB Polarimetry (DMSO): c=10.05 mg/mL, d=0.1 dm α=+0.066 deg ITC: <1 wt % free RAMEB FIG. 11 shows a ¹H NMR spectrum of the polyrotaxane prepared in Example 12.

Example 13

Polyrotaxane Prepared Via Free Radical Polymerization: poly(isoprene-co-hydroxyethyl methacrylate)-β-cyclodextrin polyrotaxane 9.20 mg (0.03 mmol) 2,2'-azobis[2-(2-imidazolin-2-yl)propane] dihydrochloride (radical initiator VA-044), 5.1 g (4.5 mmol) β-cyclodextrin 0.055 mL (0.45 mmol) of hydroxyethyl-methacrylate (first monomer) were dissolved in aqueous 8 M urea solution reaching a total volume of 25 mL and a stream of nitrogen gas was bubbled through for 30 min under stirring. After addition of 0.45 mL (0.31 g, 4.50 mmol) freshly distilled isoprene (second monomer) the nitrogen flow was stopped and the system was stirred to allow homogenous dissolution. The vessel was heated to 35° C. and stirred for 3 days. Afterwards, the reaction mixture was heated to 90° C. for 30 min and filtered at 80° C. The residue was washed with hot water and with 100 mL water/2-propanol 3:1 (v/v) and dried in vacuo. The white solid was dissolved in 40 mL DMSO and re-precipitated into a 0.1 M aqueous NaCl solution, filtered off and washed with water and dried in vacuo. The polyrotaxane (820 mg) was obtained as a white solid with 51.5 wt. % threaded cyclodextrin. For the determination of free β-cyclodextrin, 7.53 mg of polyrotaxane was dissolved in 1.0 mL of DMSO and precipitated into 9.0 mL of aqueous 0.1 M NaCl solution and filtrated. From the optical rotation of the clear filtrate α=+0.008 deg (d=1.0 dm) a content of 7 wt. % of free β-cyclodextrin was calculated assuming a specific rotation of β-cyclodextrin of $[\alpha]_D$=157 deg mL g$^{-1}$ dm$^{-1}$.

¹H-NMR (DMSO-d6, 400 MHz) δ/ppm=5.15-4.95 (methine groups), 2.05-1.85 (methylene groups) and 1.75-1.45 (methyl groups) for polyisoprene; 5.64-5.85 (m, 14H, OH-2, OH-3), 4.77-4.84 (H-1), 4.37-4.53 (OH-6), 3.43-3.65 (H-3, H-5, H-6), 3.22-3.38 (H-2, H-4) ppm for β-cyclodextrin.

Polarimetry (DMSO): c=5.58 mg/mL, d=0.1 dm, α=+0.049 deg

FIG. 12 shows a ¹H NMR spectrum of the polyrotaxane prepared in Example 13.

Example 14

Polyrotaxane Prepared Via Free Radical Polymerization: poly(isoprene-co-PEG methyl ether methacrylate)-hydroxypropyl-β-cyclodextrin polyrotaxane

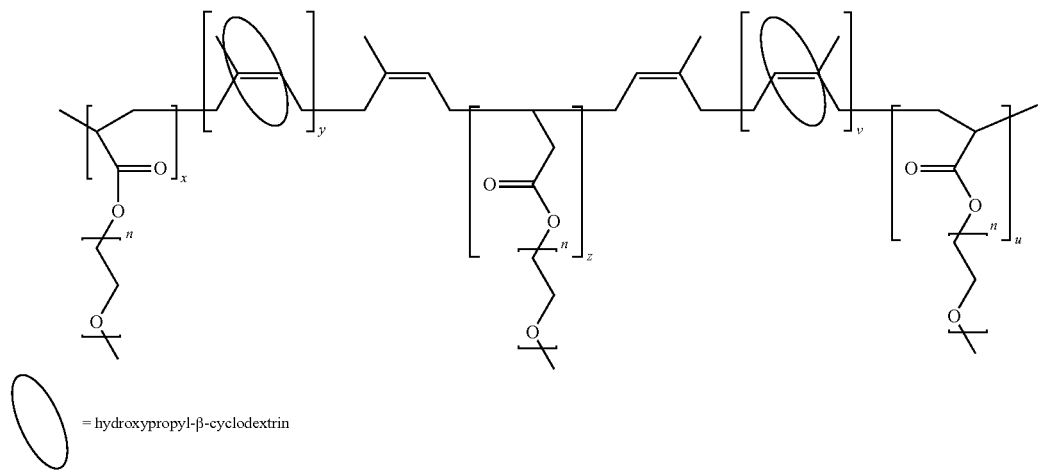

= hydroxypropyl-β-cyclodextrin 6.50 mg (0.03 mmol) ammonium persulfate (radical initiator), 5.0 g (3.33 mmol) hydroxypropyl-β-cyclodextrin (in the following denoted as "HP-β-CD", from Wacker Chemie AG, CAVASOL® W7 HP, ring-shaped molecule) and 0.17 g (0.33 mmol) poly(ethylene glycol) methyl ether methacrylate (first monomer having a stopper group) were dissolved in 10 mL deionized water and the system was bubbled through with nitrogen gas for 30 min under stirring. After addition of 0.33 mL (0.23 g, 3.33 mmol) freshly distilled isoprene (second monomer, hydrophobic) the nitrogen flow was stopped and the system was stirred to give a homogenous solution, i.e. HP-β-CD/isoprene complex formation. The reaction was started by addition of a catalytic amount (0.08 mL) of N,N,N',N'-tetramethylethylenediamine (TMEDA) and stirred at room temperature for 48 hours. After reaction, the clear aqueous solution was purified by ultrafiltration (polyethersulfone membrane, cut-off molecular weight 10 kDa). The product (120 mg) was obtained as a white powder after freeze drying with 54.5 wt. % threaded HP-β-CD and 4.5 wt. % free HP-β-CD.

TLC: $R_f$ (EtOAc/MeOH 7/3 v/v)=0, no traces of free HP β-CD $^1$H-NMR (DMSO-d6, 400 MHz) δ/ppm=5.15-4.95 (methine groups), 2.05-1.85 (methylene groups) and 1.75-1.45 ppm (methyl groups) for polyisoprene, 6.00-5.50 (m, OH), 5.01-4.60 (s, 1H, H-1), 4.50 (m, OH), 3.73-3.25 (m, H-2, H-3, H-4, H-5, H-6, H-7, H-8), 1.02 (s, methyl groups) ppm for HP β-CD.

Polarimetry: c=3.60 mg/mL, d=1 cm, α=0.025 deg
ITC: 4.5 wt % free HP β-CD
FIG. 13 shows a $^1$H NMR spectrum of the polyrotaxane prepared in Example 14.

What is claimed is:

1. A cross-linked polyrotaxane, wherein molecules of said polyrotaxane are cross-linked intermolecularly via ring-shaped molecules and a cross-linking agent; wherein said polyrotaxane comprises a ring-shaped molecule and a copolymer threading said ring-shaped molecule, wherein said copolymer is a non-ionic copolymer comprising at least (a) structural units derived from a first polymerizable monomer having a stopper group and at least (b) structural units derived from a second polymerizable monomer, wherein said structural units derived from the first monomer having a stopper group are incorporated into the chain of said copolymer at least partially between the ends thereof, wherein said stopper groups prevent the ring-shaped molecule from disassembling from the copolymer, and wherein the amount of said structural units derived from the first monomer having a stopper group is 0.1 mol % to 20 mol % based on 100 mol % of the total amount of structural units of the copolymer;

wherein said copolymer is a random copolymer, wherein said structural units derived from said first polymerizable monomer having a stopper group are incorporated randomly along the chain of said copolymer at least partially between the ends thereof; and wherein said cross-linking agent is selected from the group consisting of a diisocyanate, a blocked diisocyanate, a diisothiocyanate, a bisepoxide, cyanuric chloride, divinylsulfone, and any combination thereof.

2. A method of preparing the cross-linked polyrotaxane of claim 1, said method comprising:

(i) providing the polyrotaxane, comprising:
performing a radical copolymerization of at least (a) the first polymerizable monomer having a stopper group, and of at least (b) the second polymerizable monomer, wherein said second monomer is complexed by the ring-shaped molecule;

wherein during said copolymerization the copolymer threading said ring-shaped molecule is formed, wherein during said copolymerization said first monomer having the stopper group is incorporated into the chain of said copolymer at least partially between the ends thereof, and wherein said stopper groups prevent said ring-shaped molecule from disassembling from the copolymer;

wherein the amount of said first monomer having the stopper group is of from 0.1 mol % to 20 mol % based on 100 mol % of the total amount of polymerizable monomers;

wherein said copolymer is a non-ionic copolymer; and wherein said copolymer is the random copolymer, wherein said structural units derived from said first polymerizable monomer having the stopper group are incorporated randomly along the chain of said copolymer at least partially between the ends thereof; and (ii) cross-linking molecules of said copolymer, wherein said cross-linking comprises intermolecular cross-linking of polyrotaxanes by cross-linking of ring-shaped molecules using a cross-linking agent selected from the group consisting of a diisocyanate, a blocked diisocyanate, a diisothiocyanate, a bisepoxide, cyanuric chloride, divinylsulfone, and any combination thereof.

3. The method of claim 2, wherein step (i) comprises the steps of:

(a) providing a composition comprising the ring-shaped molecule and the first polymerizable monomer having the stopper group;

(b) combining the second polymerizable monomer with the composition of step (a) and forming a complex of said ring-shaped molecule with said second monomer; and (c) performing a radical copolymerization on the composition of step (b) to form the polyrotaxane;

wherein during said copolymerization the random copolymer threading said ring-shaped molecule is formed, wherein during said copolymerization said first monomer having the stopper group is incorporated randomly along the chain of said copolymer.

4. The method of claim 3, wherein the composition provided in step (a) comprises a radical initiator; or wherein polymerization is accelerated by adding an accelerator for radical initiation.

5. The method of claim 2, wherein the amount of said first monomer having the stopper group is of from 0.5 mol % to 18 mol % based on 100 mol % of the total amount of polymerizable monomers.

6. The method of claim 2, wherein said ring-shaped molecule is selected from the group consisting of a cyclodextrin, a cyclodextrin derivative and any combination thereof.

7. The method of claim 2, wherein said first monomer has a molecular weight of from 70 g/mol to 1000 g/mol.

8. The method of claim 2, wherein said first monomer having a stopper group is selected from the group consisting of myrcene, an aromatic vinyl monomer, N-isopropyl (meth)acrylamide, N-vinylcaprolactam, N-vinylimidazole, a poly (ethylene glycol) (meth)acrylate, an α,ω-bis(meth)acrylate, and any combination thereof; or wherein said first monomer having the stopper group is selected from the group consisting of optionally substituted styrene, optionally substituted styrenesulfonic acid, optionally substituted vinylpyridine, optionally substituted divinyl benzene, and any combination thereof.

9. The method of claim 2, wherein said second monomer is a hydrophobic monomer; or wherein said second monomer is selected from the group of vinyl monomers having a molecular weight less than 120 g/mol consisting of a 1,3-diene, a 1,3,5-triene, a (meth)acrylate, a vinyl ester, a vinyl-ether, (meth)acrylonitrile, (meth)acrylic acid, (meth)acrylamide, and any combination thereof.

10. The method of claim 9, wherein said vinyl ester is vinyl acetate.

11. The method of claim 2, wherein said copolymerization is performed in an aqueous medium; or
wherein said copolymerization is performed using a water-soluble radical initiator; or
wherein said copolymerization is carried out using a chain transfer agent.

12. The cross-linked polyrotaxane of claim 1, wherein the amount of said structural units derived from the first monomer having the stopper group is 0.5 mol % to 18 mol % based on 100 mol % of the total amount of structural units of the copolymer.

13. The cross-linked polyrotaxane of claim 1, wherein said ring-shaped molecule is selected from the group consisting of a cyclodextrin, a cyclodextrin derivative, and any combination thereof.

14. The cross-linked polyrotaxane of claim 1, wherein said first monomer has a molecular weight of from 70 g/mol to 1000 g/mol.

15. The cross-linked polyrotaxane of claim 1, wherein said first monomer having the stopper group is selected from the group consisting of myrcene, an aromatic vinyl monomer, N-isopropyl (meth)acrylamide, N-vinylcaprolactam, N-vinylimidazole, a poly(ethylene glycol) (meth)acrylate, an α,ω-bis(meth)acrylate, and any combination thereof; or
wherein said first monomer having the stopper group is selected from the group consisting of optionally substituted styrene, optionally substituted styrenesulfonic acid, optionally substituted vinylpyridine, optionally substituted divinyl benzene, and any combination thereof.

16. The cross-linked polyrotaxane of claim 1, wherein said second monomer is a hydrophobic monomer; or
wherein said second monomer is selected from the group of vinyl monomers having a molecular weight less than 120 g/mol consisting of a 1,3-diene, a 1,3,5-triene, a (meth)acrylate, a vinyl ester, a vinyl-ether, (meth)acrylonitrile, (methacrylic) acid, (meth)acrylamide, and any combination thereof.

17. The cross-linked polyrotaxane of claim 16, wherein said vinyl ester is vinyl acetate.

18. A dispersion comprising metal particles and/or metal oxide particles and a cross-linked polyrotaxane according to claim 1.

19. The cross-linked polyrotaxane of claim 1, wherein the intermolecular cross-linking of molecules of said polyrotaxane is provided by a covalent linkage between a first ring-shaped molecule threaded on is provide by a covalent linkage between the first ring-shaped molecule threaded on a first copolymer chain of the polyrotaxane and a second ring-shaped molecule threaded on a second copolymer chain of the polyrotaxane.

20. A polyrotaxane comprising a ring-shaped molecule and a copolymer threading said ring-shaped molecule, wherein said copolymer comprises at least (a) structural units derived from a first polymerizable monomer having a stopper group and at least (b) structural units derived from a second polymerizable monomer, wherein said structural units derived from the first monomer having a stopper group are incorporated into the chain of said copolymer at least partially between the ends thereof, wherein said stopper groups prevent the ring-shaped compound from disassembling from the copolymer;
wherein said copolymer is a block copolymer comprising a block A comprising repeating units derived from said first polymerizable monomer having a stopper group, a block B comprising repeating units derived from said second polymerizable monomer, and a block C comprising repeating units derived from a third polymerizable monomer, wherein said repeating units derived from said third monomer are same or different from said repeating units derived from said first monomer, wherein in said block copolymer said block B is arranged between said block A and said block C, wherein said ring-shaped molecule is threaded on block B, and wherein the combined amount of said structural units derived from said first monomer and said structural units derived from said third monomer is of from 0.1 mol % to 20 mol % based on 100 mol % of the total amount of structural units of the copolymer; and
wherein said second monomer is a hydrophobic monomer; or
wherein said second monomer is selected from the group of vinyl monomers having a molecular weight less than 120 g/mol; or
wherein said second monomer is selected from the group of vinyl monomers consisting of a 1,3-diene, a 1,3,5-triene, a (meth)acrylate, a vinyl ester, a vinyl-ether, (meth)acrylonitrile, (methacrylic) acid, (meth)acrylamide, and any combination thereof.

\* \* \* \* \*